US010606268B2

(12) United States Patent
Kim et al.

(10) Patent No.: US 10,606,268 B2
(45) Date of Patent: Mar. 31, 2020

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventors: Seonghwan Kim, Seoul (KR); Eunkyung Noh, Seoul (KR); Minah Han, Seoul (KR)

(73) Assignee: LG Electronics Inc., Seoul (KR)

( * ) Notice: Subject to any disclaimer, the term of this patent is extended or adjusted under 35 U.S.C. 154(b) by 32 days.

(21) Appl. No.: 15/663,227

(22) Filed: Jul. 28, 2017

(65) Prior Publication Data

US 2018/0088577 A1 Mar. 29, 2018

(30) Foreign Application Priority Data

Sep. 28, 2016 (KR) ........................ 10-2016-0125026

(51) Int. Cl.
*B60W 30/00* (2006.01)
*G05D 1/00* (2006.01)
(Continued)

(52) U.S. Cl.
CPC ........... *G05D 1/0088* (2013.01); *B60W 30/00* (2013.01); *B60W 50/0098* (2013.01);
(Continued)

(58) Field of Classification Search
CPC ............. B60W 50/14; B60W 2540/30; B60W 2540/26; B60W 2540/24; B60W 2540/04
(Continued)

(56) References Cited

U.S. PATENT DOCUMENTS 8,918,240 B2 * 12/2014 Manickaraj ........... B60W 20/00 180/65.8
9,132,807 B2 * 9/2015 Stadler ...................... B60S 3/00
(Continued)

FOREIGN PATENT DOCUMENTS

CN 105517873 4/2016
CN 105593104 5/2016
(Continued)

OTHER PUBLICATIONS

The modeling of transfer of steering between automated vehicle and human driver using hybrid control framework; Mani Kaustubh ; Dehlia Willemsen ; Manuel Mazo; 2016 IEEE Intelligent Vehicles Symposium (IV); pp. 808-814; IEEE Conferences. (Year: 2016).*
(Continued)

*Primary Examiner* — Cuong H Nguyen
(74) *Attorney, Agent, or Firm* — Fish & Richardson P.C.

(57) ABSTRACT

A vehicle control device that includes a communication unit that is configured to (i) communicate with a mobile device and (ii) receive data including user input that is received at the mobile device; and a processor that is configured to: based on receipt of the data including the user input, determine whether a vehicle with which the mobile device is associated operates in a manual driving mode or an autonomous driving mode and whether the user input received at the mobile device satisfies a preset condition; and based on determinations that the vehicle is in the manual driving mode and that the user input received at the mobile device satisfies the preset condition, switch the vehicle from the manual driving mode to the autonomous driving mode is disclosed.

18 Claims, 23 Drawing Sheets

(a)

(b)

(51) Int. Cl.

| | |
|---|---|
| ***G05D 1/02*** | (2020.01) |
| ***H04M 1/725*** | (2006.01) |
| ***H04M 1/60*** | (2006.01) |
| ***H04W 48/16*** | (2009.01) |
| ***B60W 50/00*** | (2006.01) |
| ***B60W 50/08*** | (2020.01) |
| ***B60W 50/10*** | (2012.01) |
| ***B60W 50/14*** | (2020.01) |

(52) U.S. Cl.
CPC ............ *B60W 50/08* (2013.01); *B60W 50/10* (2013.01); *B60W 50/14* (2013.01); *G05D 1/0061* (2013.01); *G05D 1/024* (2013.01); *G05D 1/027* (2013.01); *G05D 1/0246* (2013.01); *H04M 1/6091* (2013.01); *H04M 1/7253* (2013.01); *H04M 1/72569* (2013.01); *H04M 1/72577* (2013.01); *H04W 48/16* (2013.01); *B60K 2370/563* (2019.05); *B60K 2370/566* (2019.05); *B60K 2370/569* (2019.05); *B60K 2370/573* (2019.05); *B60W 2050/007* (2013.01); *B60W 2050/0064* (2013.01); *B60W 2050/0075* (2013.01); *B60W 2050/0095* (2013.01); *B60W 2540/04* (2013.01)

(58) Field of Classification Search
USPC ........................ 701/2, 41; 340/937, 461, 438
See application file for complete search history.

(56) References Cited

U.S. PATENT DOCUMENTS

| | | | | |
|---|---|---|---|---|
| 9,238,467 | B1 * | 1/2016 | Hoye | B60W 50/14 |
| 2008/0221776 | A1 | 9/2008 | McClellan | |
| 2014/0048104 | A1 * | 2/2014 | Stadler | B60S 3/00 134/18 |
| 2014/0277878 | A1 * | 9/2014 | Manickaraj | B60W 20/00 701/22 |
| 2016/0187879 | A1 * | 6/2016 | Mere | G05D 1/0061 701/23 |

FOREIGN PATENT DOCUMENTS

| | | |
|---|---|---|
| DE | 102009054100 | 6/2010 |
| JP | 2000062542 | 2/2000 |
| JP | 2014232411 | 12/2014 |
| JP | 2016006628 | 1/2016 |
| JP | 2016090274 | 5/2016 |
| JP | 2016124542 | 7/2016 |
| KR | 1020150086910 | 7/2015 |
| KR | 101624191 | 5/2016 |
| KR | 1020160065589 | 6/2016 |
| KR | 1020160075893 | 6/2016 |

OTHER PUBLICATIONS

Body posture and face orientation estimation by convolutional network with heterogeneous learning; Kaoruko Okuno et al., 2018 International Workshop on Advanced Image Technology (IWAIT); pp. 1-4; IEEE Conferences. (Year: 2018).*

Extended European Search Report and European Search Opinion in European Application No. 17178016.6, dated Nov. 28, 2017, 7 pages (with English translation).

Chinese Office Action in Chinese Application No. 201710740649.0, dated Oct. 9, 2019, 16 pages (with English translation).

* cited by examiner (a)

(b)

(a)

(b)

(a)

(b)

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2016-0125026, filed on Sep. 28, 2016, the contents of which are incorporated by reference herein in its entirety.

TECHNICAL FILED

This present application generally relates to technologies about a vehicle control device for a vehicle.

BACKGROUND

A vehicle is an apparatus capable of moving a user in the user-desired direction, and a representative example may be a car. For convenience of a user using a vehicle, various types of sensors and electronic devices are provided in the vehicle. Specifically, a study on an Advanced Driver Assistance System (ADAS) is actively undergoing. In addition, an autonomous vehicle is actively under development. As the development of the advanced driving assist system (ADAS) is actively undergoing in recent time, development of a technology for optimizing user's convenience and safety while driving a vehicle is required. As part of this, technology development on various user interfaces/user experiences (UIs/UXs) for autonomous driving in which a vehicle drives on its own without any driver's manipulation have been actively carried out.

SUMMARY

The present disclosure is related to a vehicle control device that communicated with a mobile device of a user.

In general, one innovative aspect of the subject matter described in this specification can be embodied in a vehicle control device including a communication unit that is configured to (i) communicate with a mobile device and (ii) receive data including user input that is received at the mobile device; and a processor that is configured to: based on receipt of the data including the user input, determine whether a vehicle with which the mobile device is associated operates in a manual driving mode or an autonomous driving mode and whether the user input received at the mobile device satisfies a preset condition; and based on determinations that the vehicle is in the manual driving mode and that the user input received at the mobile device satisfies the preset condition, switch the vehicle from the manual driving mode to the autonomous driving mode.

The foregoing and other embodiments can each optionally include one or more of the following features, alone or in combination. In particular, one embodiment includes all the following features in combination. The vehicle control device further includes a camera that is configured to obtain first eye tracking information of a user, wherein the processor is configured to: obtain, from the camera, the first eye tracking information, based on the first eye tracking information, determine whether the user uses the mobile device for a first time period, and based on determinations that the vehicle is in the manual driving mode and that the user uses the mobile device for the first time period, switch the vehicle from the manual driving mode to the autonomous driving mode. The user input includes second eye tracking information of a user, and wherein the processor is configured to: based on the second eye tracking information, determine whether the user uses the mobile device for a second time period, and based on determinations that the vehicle is in the manual driving mode and that the user uses the mobile device for the second time period, switch the vehicle from the manual driving mode the autonomous driving mode. A plurality of menu items are displayed on the mobile device, each of the plurality of menu items being associated with a respective menu level, and wherein the processor is configured to: based on the data including the user input, determine whether a first menu level for a first menu item from the plurality of menu items is selected by a user, based on a determination that the first menu level for the first menu item from the plurality of menu items is selected by the user, determine whether the first menu level satisfies a threshold menu level, and based on determinations that the vehicle is in the manual driving mode and that the first menu level satisfies the threshold menu level, switch the vehicle from the manual driving mode to the autonomous driving mode. The processor is configured to: based on the data including the user input, determine a time period that the user input has been received, and based on (i) a determination that the vehicle is in the manual driving mode and (ii) the time period, switch the vehicle from the manual driving mode to the autonomous driving mode. The data that is received by the communication unit from the mobile device further includes orientation information of the mobile device, and wherein the processor is configured to: based on (i) a determination that the vehicle is in the manual driving mode and (ii) the orientation information of the mobile device, switch the vehicle from the manual driving mode to the autonomous driving mode. The processor is configured to: generate, based on the orientation information of the mobile device, a command signal that controls the mobile device to perform a first function, and provide, through the communication unit, the command signal to the mobile device. The processor is configured to: determine whether switching between the manual driving mode and the autonomous driving mode is locked, and based on (i) a determination that the vehicle is in the manual driving mode, (ii) the orientation information of the mobile device, and (iii) a determination of whether switching between the manual driving mode and the autonomous driving mode is locked, determine whether the command signal is provided to the mobile device. The orientation information of the mobile device includes a direction that the mobile device is facing or a tilt angle of the mobile device. The processor is configured to: provide, based on the orientation information, screen information that is displayed on a display of the mobile device to a display unit of the vehicle through the communication unit. The data that is received by the communication unit from the mobile device further includes information about a plurality of applications that are executed on the mobile device, each of the plurality of applications being associated with a respective type, and wherein the processor is configured to: based on (i) a determination that the vehicle is in the manual driving mode and (ii) the respective types of the plurality of applications, switch the vehicle from the manual driving mode to the autonomous driving mode. The processor is configured to: determine whether the mobile device executes a first type of application from the plurality of applications or a second type of application from the plurality of applications, the second type of application being different from the first type of application, and based on determinations that the vehicle is in the manual driving mode and that the mobile device executes the first type of application from the plurality of applications or the second type of application from the plurality of applications, switch the vehicle from the manual driving mode to the autonomous driving mode. The data that is received by the communication unit from the mobile device further includes orientation information of the mobile device, and wherein the processor is configured to: based on (i) a determination that the vehicle is in the manual driving mode, (ii) the orientation information of the mobile device, and (iii) a determination that the mobile device executes the first type of application from the plurality of applications or the second type of application from the plurality of applications, switch the vehicle from the manual driving mode to the autonomous driving mode. The data that is received by the communication unit from the mobile device further includes (i) touch input and (ii) information about an event that occurs on the mobile device, and wherein the processor is configured to: based on (i) a determination that the vehicle is in the manual driving mode, (ii) the touch input, and (iii) the event that occurs on the mobile device, switch the vehicle from the manual driving mode to the autonomous driving mode. The data that is received by the communication unit from the mobile device further includes information about a connection between the mobile device and the communication unit, and wherein the processor is configured to: based on (i) a determination that the vehicle is in the manual driving mode, (ii) the information about the connection between the mobile device and the communication unit, and (iii) the event that occurs on the mobile device, switch the vehicle from the manual driving mode to the autonomous driving mode. The processor is configured to: determine whether a wired connection between the mobile device and the communication unit is released, and based on determinations that the vehicle is in the manual driving mode and that the wired connection between the mobile device and the communication unit is released, switch the vehicle from the manual driving mode to the autonomous driving mode. The data that is received by the communication unit from the mobile device further includes information about a movement of the mobile device, and wherein the processor is configured to: based on a determination that the vehicle is in the manual driving mode and the information about the movement of the mobile device, switch the vehicle from the manual driving mode to the autonomous driving mode. The information about the movement of the mobile device includes a distance or a direction that the mobile device is moved.

In general, another innovative aspect of the subject matter described in this specification can be embodied in a control method of a vehicle, the control method including: connecting to a mobile device to enable communication; receiving, from the mobile device, data including user input that is received at the mobile device; based on receipt of the data including the user input, determine whether a vehicle with which the mobile device is associated operates in a manual driving mode or an autonomous driving mode and whether the user input received at the mobile device satisfies a preset condition; and based on determinations that the vehicle is in the manual driving mode and that the user input received at the mobile device satisfies the preset condition, switch the vehicle from the manual driving mode to the autonomous driving mode.

The foregoing and other embodiments can each optionally include one or more of the following features, alone or in combination. In particular, one embodiment includes all the following features in combination. The control method further includes obtaining eye tracking information of a user; based on the eye tracking information of the user, determine whether the eye tracking information satisfies the preset condition indicating that the user uses the mobile device for a first time period; and based on determinations that the vehicle is in the manual driving mode and the eye tracking information satisfies the preset condition, switch the vehicle from the manual driving mode to the autonomous driving mode.

The subject matter described in this specification can be implemented in particular embodiments so as to realize one or more of the following advantages. Comparing to a conventional vehicle system, a vehicle control device can control a vehicle or a vehicle system based on user's activities, events, or user inputs made in a mobile device of a user. In particular, the vehicle control device can control the vehicle to be operated in an autonomous driving mode or a manual driving mode based on the user's activities, events, or user inputs. Thus, the vehicle control device can efficiently determine a driving mode of the vehicle based on given circumstances and improve road safety.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
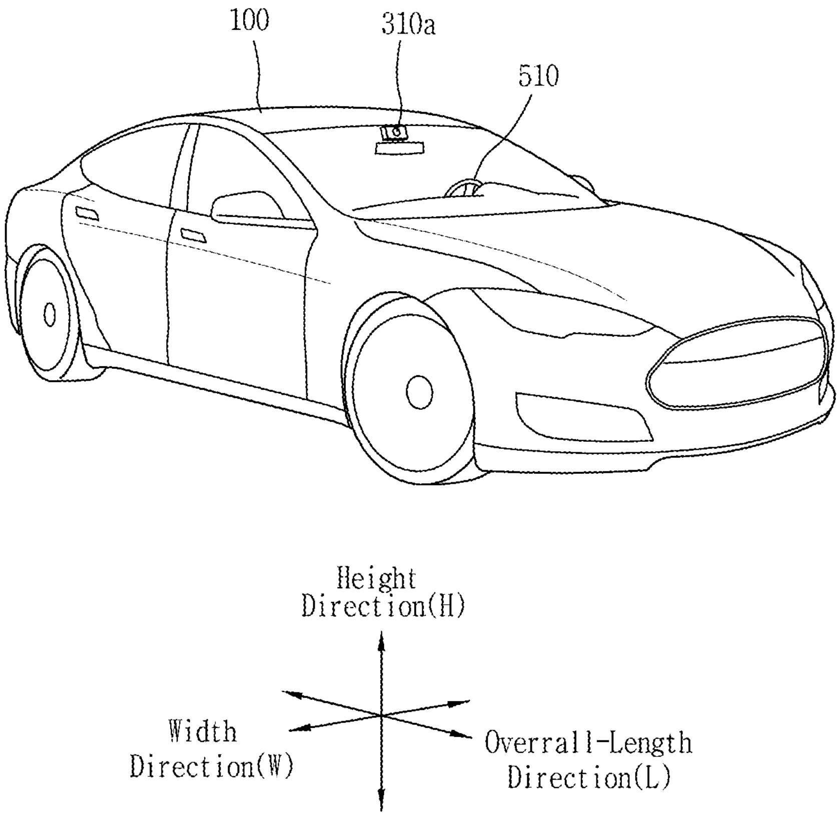
FIG. 1 is a diagram illustrating an example vehicle.
Figure 2:
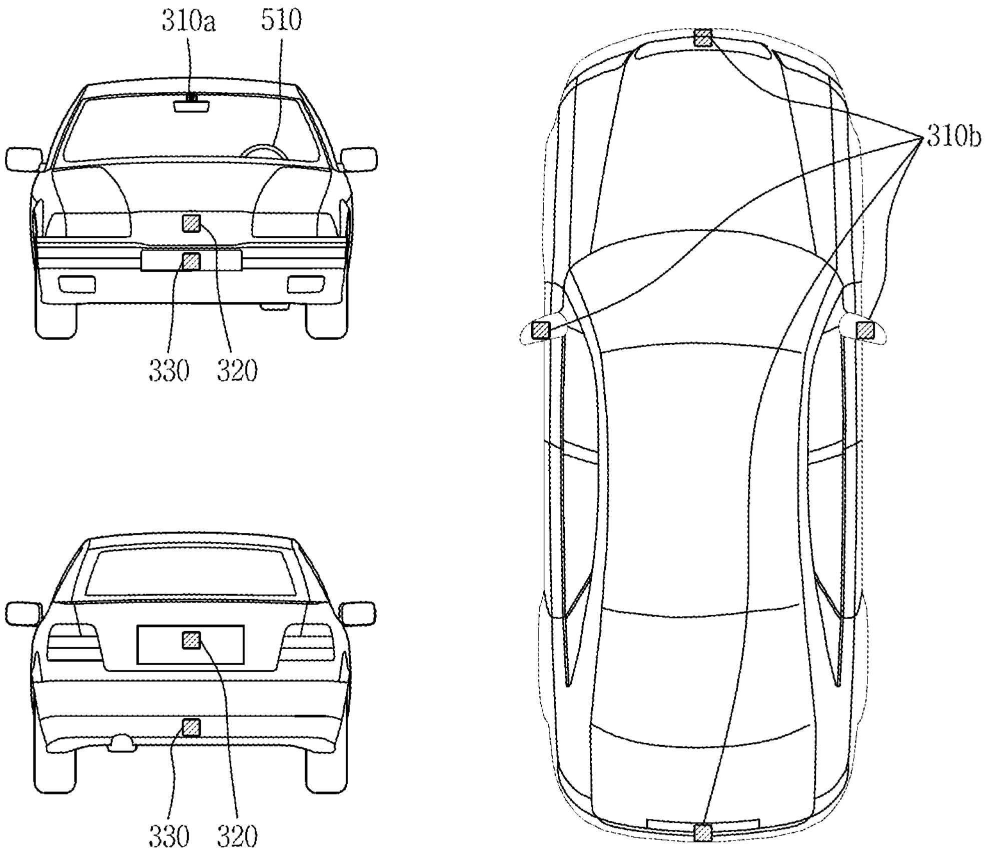
FIG. 2 is a diagram illustrating an example vehicle.
Figure 3:
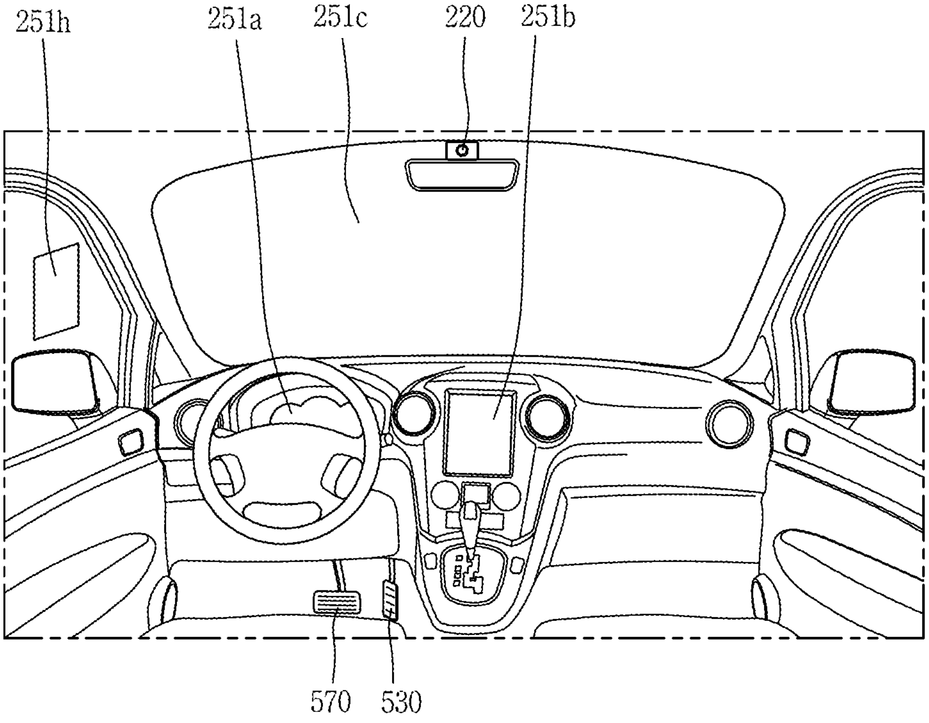
FIGS. 3 and 4 are diagrams illustrating an example interior of a vehicle.
Figure 4:
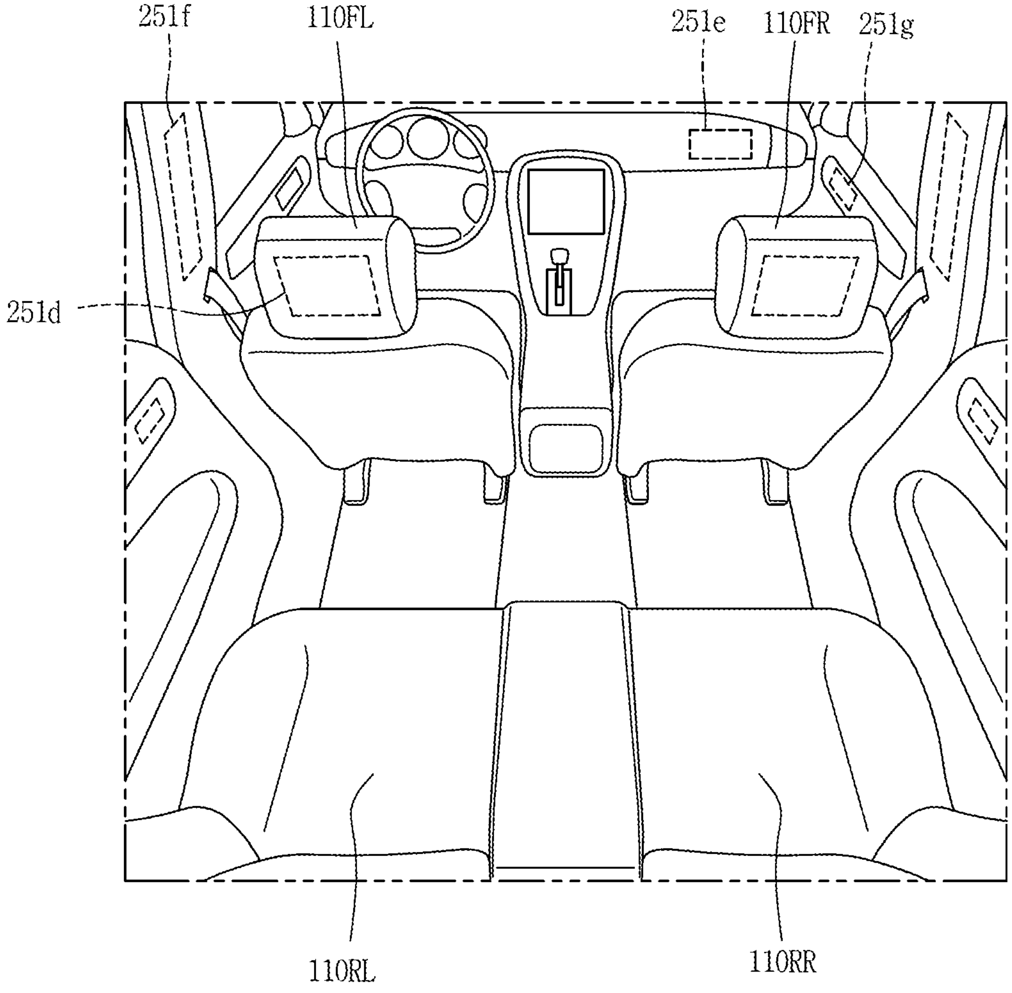
Figure 5:
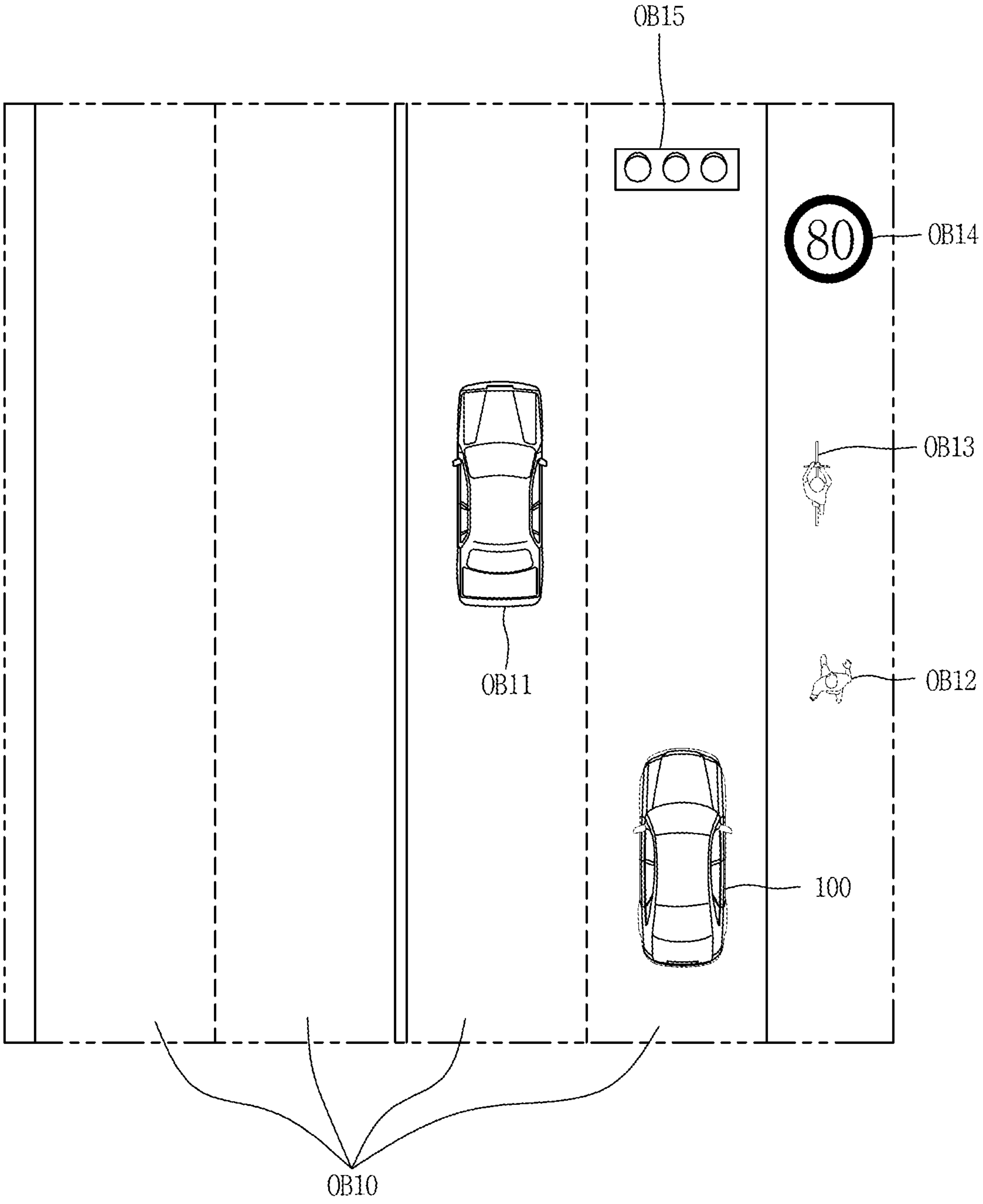
FIGS. 5 and 6 are diagrams illustrating example operations of a vehicle.
Figure 6:
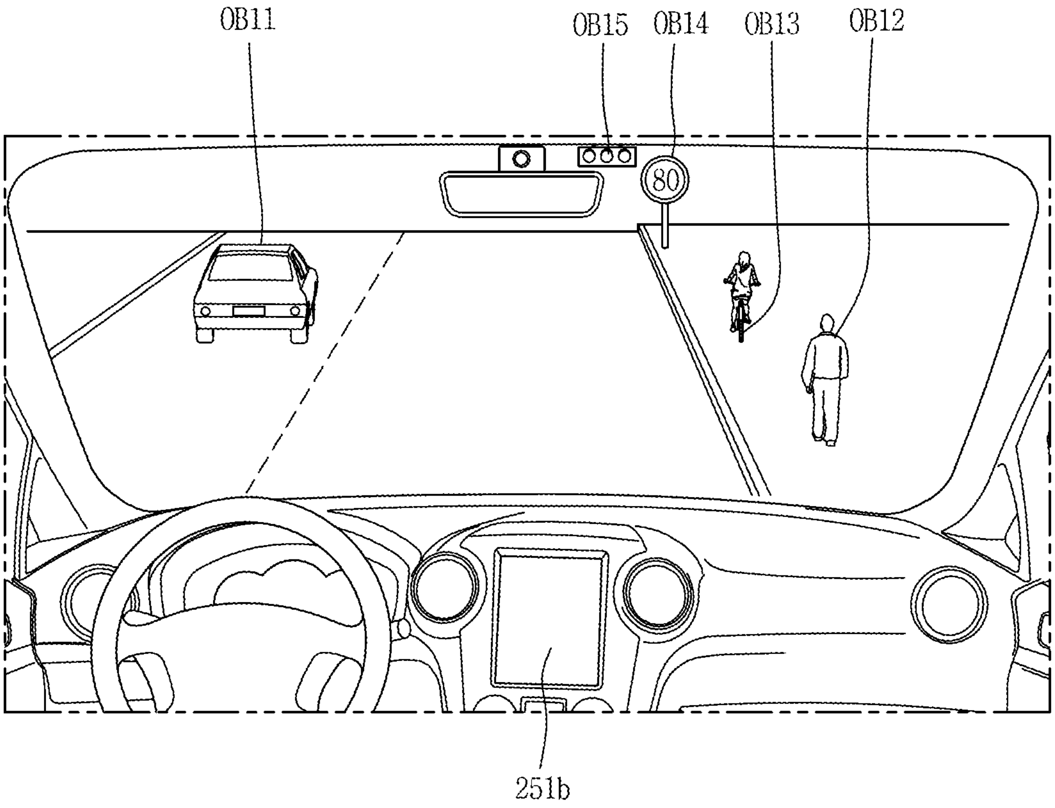
Figure 7:
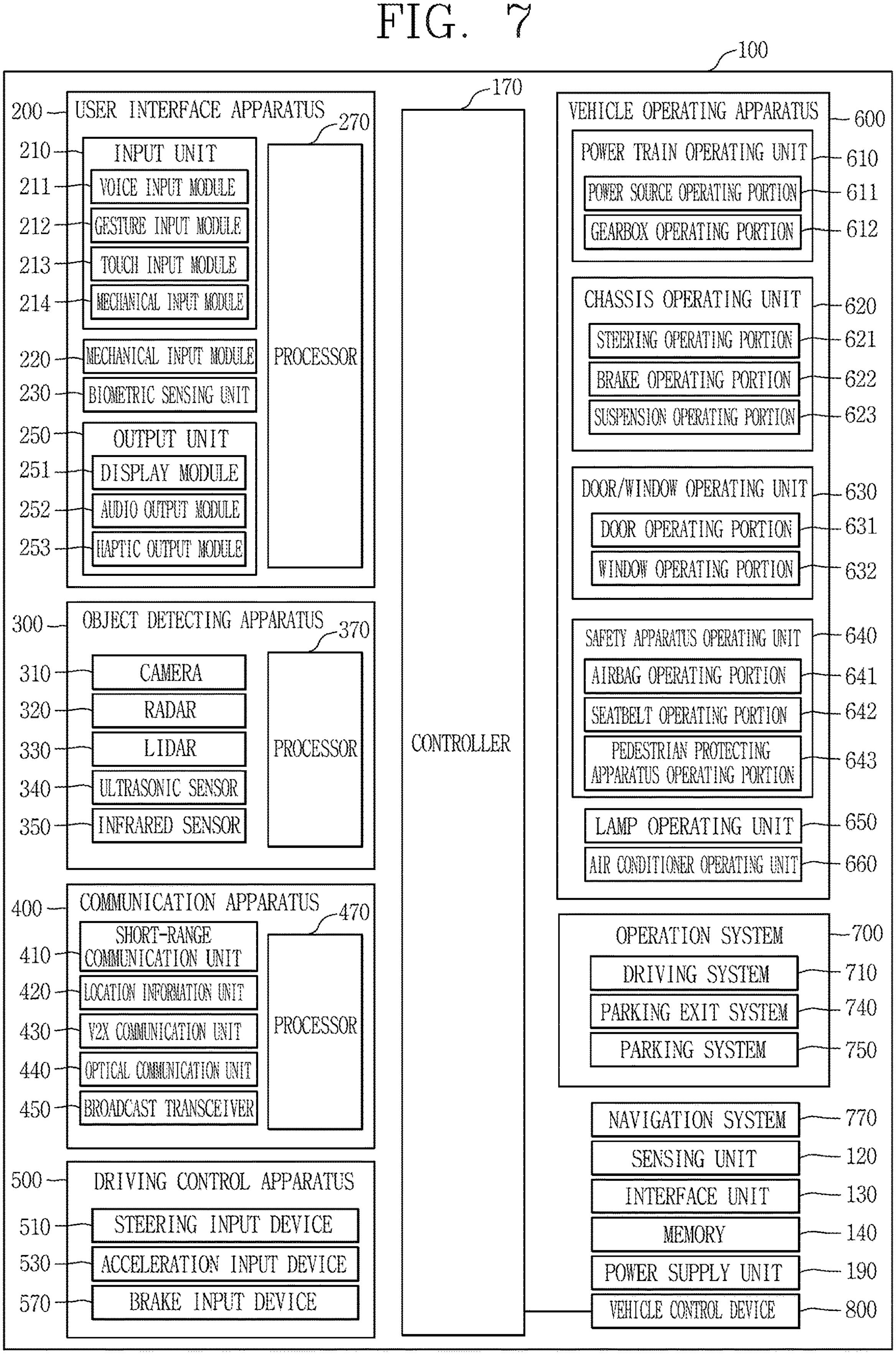
FIG. 7 is a diagram illustrating an example vehicle system.

FIGS. 1 and 2 illustrate an example vehicle. FIGS. 3 and 4 illustrate an example interior of a vehicle. FIGS. 5 and 6 illustrate an example operations of a vehicle. FIG. 7 illustrates an example vehicle system.

As illustrated in FIGS. 1 to 7, a vehicle 100 includes wheels turning by a driving force, and a steering apparatus 510 for adjusting a driving (e.g., ongoing or moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

In some implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270. In some implementations, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display unit 251 so as to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In some implementations, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may be operated by a control of a processor of another apparatus within the vehicle 100 or the controller 170.

In some implementations, the user interface apparatus 200 may be called as a display apparatus for a vehicle.

The user interface apparatus 200 may be operated by the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310*a*, an around view monitoring (AVM) camera 310*b* or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may be operated by the control of a processor of an apparatus within the vehicle 100 or the controller 170.

The object detecting apparatus 300 may be operated by the control of the controller 170.

The communication apparatus 400 is an apparatus for performing communication with an external device. In this example, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

In some implementations, the communication apparatus 400 may include a plurality of processors 470 or may not include any processor 470.

When the processor 470 is not included in the communication apparatus 400, the communication apparatus 400 may be operated by the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may be operated by the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. In some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. In some implementations, the acceleration input device or the brake input device may also be configured in a shape of a touch screen, a touchpad or a button.

The driving control apparatus 500 may be operated by the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

In some implementations, the vehicle operating apparatus 600 may further include other components in addition to the components described, or may not include some of the components described.

In some implementations, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may be operated by the control of the controller 170.

The operation system 700 is a system that controls various driving modes of the vehicle 100. The operation system 700 may include a driving system 710, a parking exit system 740 and a parking system 750.

In some implementations, the operation system 700 may further include other components in addition to components to be described, or may not include some of the components to be described.

In some implementations, the operation system 700 may include a processor. Each unit of the operation system 700 may individually include a processor.

In some implementations, the operation system may be a sub concept of the controller 170 when it is implemented in a software configuration.

In some implementations, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some implementations, the vehicle 100 may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Figure 8:
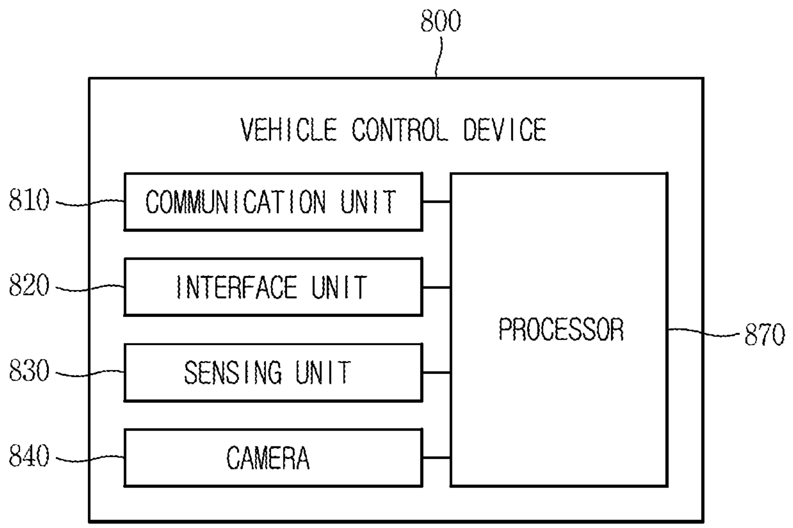
FIG. 8 is a diagram illustrating an example vehicle control device.

FIG. 8 illustrates an example vehicle control device.

The vehicle control device 800 may include a communication unit 810, an interface unit 820, a sensing unit 830, a camera 840, a processor 870, and the like.

The communication unit 810 may be the foregoing communication apparatus 400. the communication unit 810 may be connected to the mobile terminal existing in the vehicle 100 to enable communication.

For an example, the vehicle control device 800 (or the vehicle 100) and the mobile terminal may be connected through the communication unit 810 to enable wireless communication. The vehicle control device 800 and the mobile terminal may be connected to each other in a wireless manner to enable communication by a user request or connected to each other in a wireless manner to enable communication based on the mobile terminal entering an inside of the vehicle if they have been previously connected to enable communication.

The communication unit 810 may be provided within a vehicle (or within a vehicle control device), or formed in the form of an additional module and formed to enable communication (or electrical coupling) with a constituent element of the vehicle.

The interface unit 820 may be the foregoing interface unit 130.

The interface unit 820 may perform the role of a path to various types of external devices connected to the vehicle 100. For example, the interface unit 820 may include a portion that can be connected to the mobile terminal, and connected to the mobile terminal through the port. In this example, the interface unit 820 may exchange data with the mobile terminal.

The interface unit 820 and the mobile terminal may be connected in a wired manner to enable wired communication through a port.

In the aspect of performing communication with the mobile terminal (external device), it may be understood that interface unit 820 is included in the communication unit 810.

In some implementations, the interface unit 820 may perform the role of a path for supplying electric energy to the mobile terminal connected thereto. When the mobile terminal is electrically connected to the interface unit 820, the interface unit 820 may provide electrical energy supplied from the power supply unit 190 to the mobile terminal according to the control of the controller 170 (or the vehicle control device 800).

The sensing unit 830 included in the vehicle control device 800 may be the object detecting apparatus 300 illustrated in FIG. 7 or the sensing unit 120 provided in the vehicle 100.

Furthermore, the sensing unit 830 may be an additional sensing unit that is independent from the object detecting apparatus 300 provided in the vehicle or the sensing unit 120 provided in the vehicle 100. Even when the sensing unit 830 is an independent sensing unit, the sensing unit 830 may include the characteristics of the sensing unit 120 or object detecting apparatus 300 illustrated in FIG. 7.

Furthermore, the sensing unit 830 may be implemented in combination with at least two of the camera 310, the radar 320, the lidar 330, the ultrasonic sensor 340, the infrared sensor, and the sensing unit 120.

The sensing unit 830 may sense information associated with the vehicle 100.

The information associated with the vehicle may be at least one of vehicle information (or driving status of the vehicle) and surrounding information of the vehicle.

For example, the vehicle information may include a driving speed of the vehicle, a weight of the vehicle, a number of passengers in the vehicle, a braking force of the vehicle, a maximum braking force of the vehicle, a driving mode of the vehicle (autonomous driving mode or manual driving mode), a parking mode of the vehicle (autonomous parting mode, automatic parking mode, manual parking mode), whether or not a user gets on the vehicle, and information associated with the user (for example, whether or not the user is an authenticated user), and the like.

The surrounding information of the vehicle may be a state of road surface on which the vehicle is travelling, weather, a distance from a front-side (rear-side) vehicle, a relative speed of a front-side (rear-side) vehicle, a curvature of curve when a driving lane is the curve, an ambient brightness of the vehicle, information associated with an object existing in a reference region (predetermined region) based on the vehicle, whether or not an object enters (or leaves) the predetermined region, whether or not a user exists around the vehicle, and information associated with the user (for example, whether or not the user is an authenticated user), and the like.

Furthermore, the surrounding information (or surrounding environment information) of the vehicle may include external information of the vehicle (for example, ambient brightness, a temperature, a position of the sun, nearby subject (a person, another vehicle, a sign, etc.) information, a type of driving road surface, a landmark, line information, driving lane information), and information required for an autonomous driving/autonomous parking/automatic parking/manual parking mode.

Furthermore, the surrounding information of the vehicle may further include a distance from an object existing around the vehicle to the vehicle 100, a type of the object, a parking space for the vehicle, an object for identifying the parking space (for example, a parking line, a string, another vehicle, a wall, etc.), and the like.

Hereinafter, for the sake of convenience of explanation, a configuration in which the sensing unit 830 is additionally provided in the vehicle control device 800 will be described as an example. Allowing the processor 870 to acquire any information through the sensing unit 830 may be understood as allowing the processor 870 to acquire any information using at least one of the object detecting apparatus 300 and the sensing unit 120 provided in the vehicle 100.

Furthermore, the sensing unit 830 may sense a user input received from (or applied to) the mobile terminal existing in the vehicle. For example, the processor 870 may sense whether or not a driver (or user) manipulates the mobile terminal, whether or not the driver gazes at the mobile terminal, a user input received at the mobile terminal, and the like using the internal camera 220, the camera 310, the radar 320, the lidar 330, the ultrasonic sensor 340, the infrared sensor 350, and the like.

The camera 840 may be formed to capture an inside of the vehicle. The camera 840 may be the foregoing internal camera 220.

The processor 870 may sense a user input received at the mobile terminal existing in the vehicle based on an image (or preview image) received through the camera 840.

For example, the processor 870 may analyze an image received through the camera 840 to sense whether or not the driver (user) manipulates the mobile terminal, the driver's line of sight, whether or not the driver gazes at the mobile terminal, a user input received at the mobile terminal, and the like.

The processor 870 may sense (determine, extract, detect, judge) a user input received at the mobile terminal through wired/wireless communication with the mobile terminal as well as the sensing unit 830 and camera 840.

The mobile terminal may include may include a communication unit, an interface unit, a touch screen, a sensing unit, a controller and the like.

When a user input is received in a state of being connected in a wired/wireless manner to the vehicle control device (or a vehicle) to enable communication, the controller of the mobile terminal may transmit information associated with the received user input to the vehicle control device 800 (or a vehicle) through the communication unit.

The information associated with the user input may include a type, a time, a position, and the like of the received user input.

For example, when a touch is received on the touch screen of the mobile terminal, the controller of the mobile terminal may transmit information associated with a position to which the touch is applied, a time at which the touch is applied, a type of the touch, and the like to the vehicle control device (or a vehicle) through the communication unit.

Furthermore, the sensing unit of the mobile terminal may include a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). In some implementations, the mobile terminal disclosed herein may utilize information in combination with information sensed by at least two sensors of those sensors.

The controller of the mobile terminal may sense a user input received at the mobile terminal using the sensing unit of the mobile terminal. Furthermore, the controller of the mobile terminal may sense a movement of the mobile terminal, orientation information of the mobile terminal (e.g., an inclination of the mobile terminal), eye tracking information (e.g., a user's line of sight), and various other information of the mobile terminal.

Such a movement of the mobile terminal, an inclination, a user's line of sight, and the like may be included in the user input received at the mobile terminal.

The controller of the mobile terminal may transmit information associated with a user input sensed through the sensing unit of the mobile terminal to the vehicle control device (or a vehicle) through the communication unit.

The processor 870 of the vehicle control device 800 may determine (sense, extract, judge, detect) a user input received at the mobile terminal based on information associated with the user input received through the communication unit 810.

The vehicle control device 800 may include the processor 870 capable of controlling the communication unit 810, the interface unit 820, the sensing unit 830, the camera 840, and the like.

The processor 870 may be the controller 170 illustrated in FIG. 7.

The processor 870 may control constituent elements illustrated in FIG. 7 and constituent elements illustrated in FIG. 8.

The processor 870 included in the vehicle control device 800 may switch the manual driving mode to the autonomous driving mode based on that a user input received at the mobile terminal satisfies a preset condition.

Figure 9:
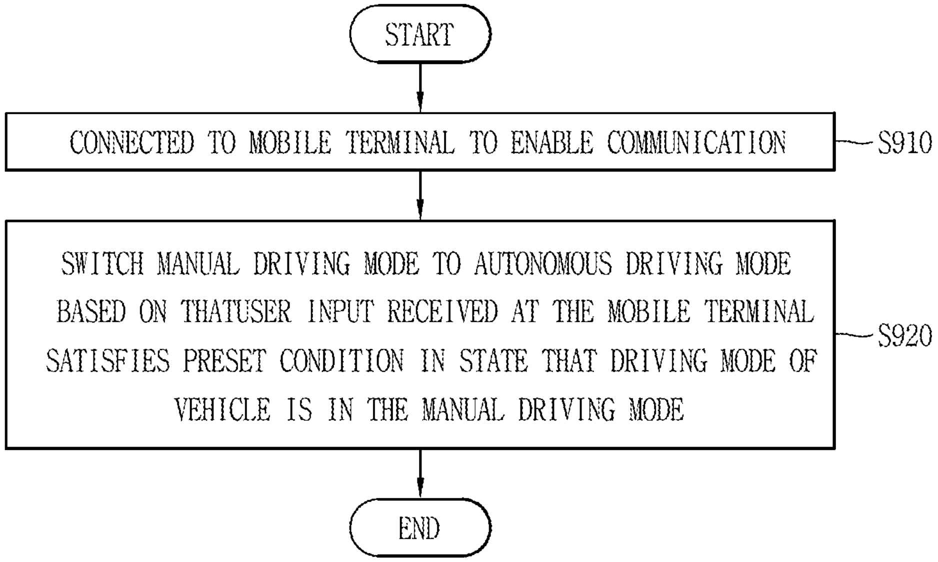
FIG. 9 is a flowchart of an example process for controlling a vehicle.

FIG. 9 is a flowchart of an example process for controlling a vehicle. FIGS. 10A to 16 illustrate example operations of a vehicle.

Referring to FIG. 9, first, the process of connecting the mobile terminal to enable communication is carried out (S910).

Specifically, the processor 870 may be connected to the mobile terminal in a wired/wireless manner to enable wired/wireless communication with the mobile terminal existing in the vehicle through the communication unit 810.

For example, the processor 870 may control the communication unit 810 to enable wireless communication with the mobile terminal when the mobile terminal enters into the vehicle (or the mobile terminal is mounted within the vehicle) based on a user request.

For another example, the processor 870 may perform wired communication with the mobile terminal when connected to the mobile terminal in a wired manner through the interface unit 820.

In addition, the vehicle control device 800 and the mobile terminal may be connected to each other to enable wired/wireless communication based on the satisfaction of a preset condition.

Then, the process of switching a manual driving mode to an autonomous driving mode based on that a user input received at the mobile terminal satisfies a preset condition in a state that a driving mode of the vehicle 100 is in the manual driving mode (S920).

Specifically, the processor 870 may sense a user input received at the mobile terminal 1000 existing in the vehicle in a state that a driving mode of the vehicle 100 is in a manual driving mode.

For an example, the processor 870 may sense a user input received at (applied to) the mobile terminal 1000 connected thereto to enable communication using at least one of the sensing unit 830 and camera 840.

For another example, when a user input is sensed through the sensing unit (or camera) of the mobile terminal, the processor 870 may receive information associated with the sensed user input from the mobile terminal, and determine the user input received at (applied to) the mobile terminal 1000 based on information associated with the received user input.

The vehicle 100 may operate in either one mode of a manual driving mode and an autonomous driving mode. In other words, a driving mode of the vehicle 100 may include a manual driving mode and an autonomous driving mode.

The manual driving mode may denote a mode in which the vehicle is driven by a driver's driving manipulation. For an example, in the manual driving mode, a steering of the vehicle may be changed based on the driver's manipulation of a steering wheel, and a speed of the vehicle may vary by the manipulation of a brake pedal or acceleration pedal.

The autonomous driving mode (or automatic driving mode) may denote a mode in which a vehicle drives on its own based on a preset algorithm regardless of a driver's driving manipulation. For an example, the autonomous driving mode may be a mode in which a vehicle drives (travels) on its own for at least part of a predetermined route or a route up to a destination set by the user.

In the autonomous driving mode, for an example, a vehicle may drive according to a preset algorithm to perform autonomous driving without varying the steering or speed of the vehicle even though there is the driver's driving manipulation.

The manual driving mode and autonomous driving mode belong to a general technical field, and thus the detailed description thereof will be omitted.

The processor 870 of the vehicle control device 800 may sense (determine, extract, detect, judge) a user input received at the mobile terminal (or mobile terminal existing in the vehicle) connected thereto to enable communication in a state that a driving mode of the vehicle is in a manual driving mode.

Then, the processor 870 may change a driving mode of the vehicle from a manual driving mode to an autonomous driving mode based on that a user input received at the mobile terminal satisfies a preset condition.

In this example, the user input received at the mobile terminal may include various types of inputs. For example, a user input received at the mobile terminal may include a touch applied to the mobile terminal, a gesture, a motion of the mobile terminal, a movement, a rotation, an inclination, a line of sight in which the user gazes at the mobile terminal, and the like.

Such a user input may be sensed through at least one of the camera 840 and the sensing unit 830, 120 provided in the vehicle control device (or a vehicle) or sensed through at least one of a touch screen, a camera, and a sensing unit as described above.

The processor 870 may be connected to the mobile terminal 1000 to enable communication, and thus determine a user input based on information associated with the user input transmitted from the mobile terminal even though the user input is sensed at the mobile terminal.

The processor 870 may determine whether or not a user input received at the mobile terminal satisfies a preset condition. Specifically, when a user input is received at the mobile terminal in a state that a driving mode of the mobile terminal is in a manual driving mode, the processor 870 may determine whether or not the received user input satisfies a preset condition.

In this example, the preset condition may denote a user input preset to change a driving mode of the vehicle among various user inputs received at the mobile terminal.

The preset condition may include whether or not a driver's line of sight faces the mobile terminal for more than a predetermined period of time, whether or not a depth of a menu selected on the mobile terminal is above a predetermined depth, whether or not the mobile terminal is inclined more than a predetermined angle in one direction, a type of application executed on the mobile terminal, a type of event occurred on the mobile terminal, whether or not the mobile terminal moves in a preset movement, whether or not a wired connection of the mobile terminal is released, and the like.

In addition, the vehicle control device may change a driving mode of the vehicle 100 from an autonomous driving mode to a manual driving mode based on the satisfaction of a specific condition.

Figure 10A:
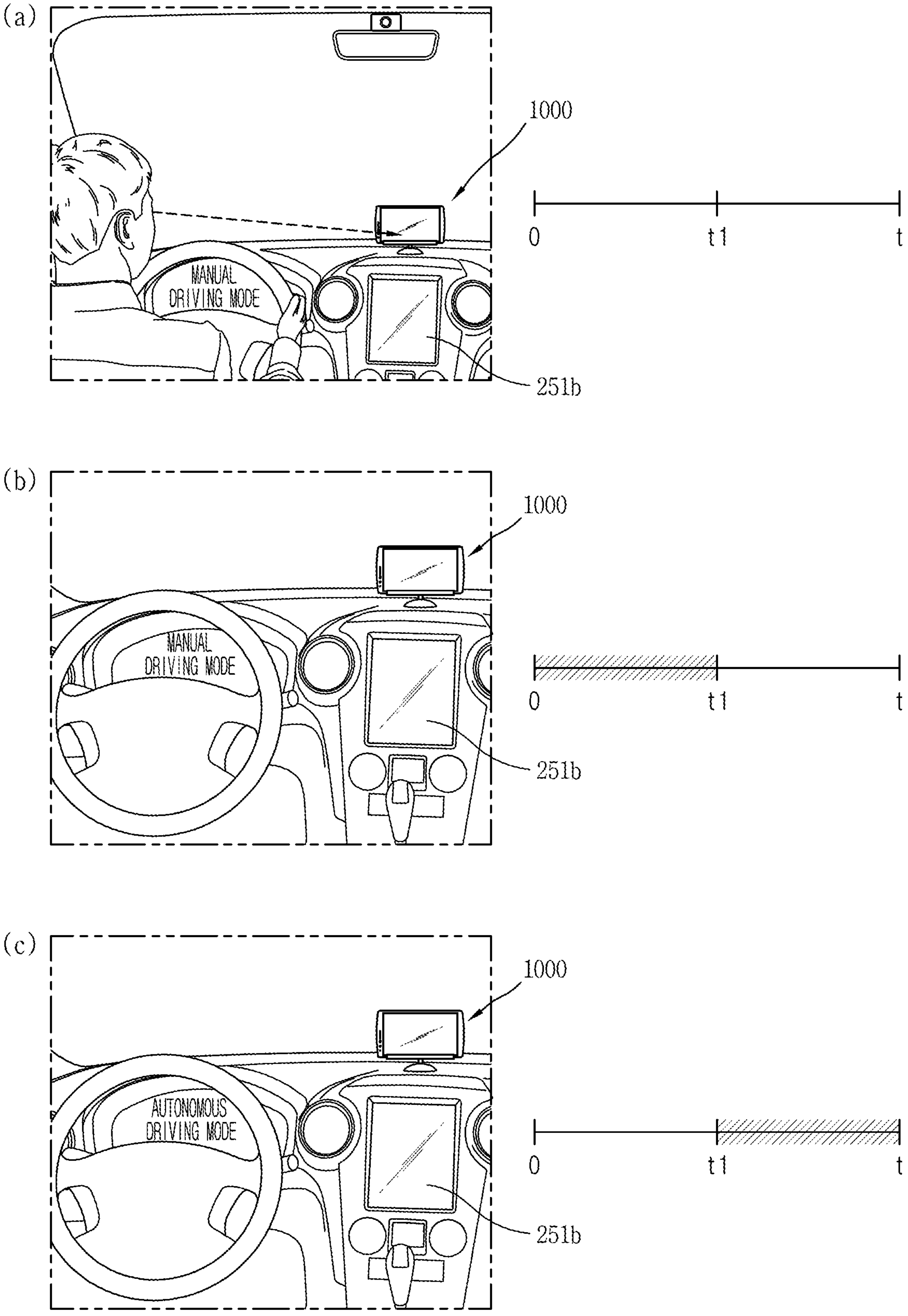
FIGS. 10A to 16 are diagrams illustrating example operations of a vehicle.

Referring to FIG. 10A, the vehicle control device 800 (or the vehicle 100) may include the camera 840 (or internal camera 220) configured to sense a driver's line of sight.

The processor 870 may sense a user input received at the mobile terminal 1000 using the camera 840. In this example, the user input may include a driver's line of sight.

Furthermore, the controller of the mobile terminal 1000 may sense a driver's line of sight using a camera provided in the mobile terminal 1000. Then, the mobile terminal 1000 may information associated with the sensed driver's line of sight to the vehicle control device 800 (or the vehicle 100) through wired/wireless communication.

The processor 870 may sense a driver's line of sight based on information associated with the driver's line of sight received from the mobile terminal.

The driver's line of sight may be sensed through the sensing unit 830, 120 or the sensing unit of the mobile terminal as well as the camera 840 and the camera of the mobile terminal.

The driver's line of sight may be sensed when a driving mode of the vehicle is in a manual driving mode, for an example. In some implementations, the driver's line of sight may be sensed even when the driving mode of the vehicle is in an autonomous driving mode.

The processor 870 may switch a manual driving mode to an autonomous driving mode based on that the driver's line of sight sensed through at least one of the camera 840 (or sensing unit 830) and the camera (or sensing unit) of the mobile terminal gazes the mobile terminal 1000 for more than a predetermined touch input (t1).

For example, as illustrated in FIG. 10A(c), when the sensed driver's line of sight gazes at the mobile terminal 1000 for more than a predetermined period of time (t1) in a state that a driving mode of the vehicle is in a manual driving mode, the processor 870 may change the distinguished manner of the vehicle from the manual driving mode to the autonomous driving mode.

On the contrary, as illustrated in FIG. 10A(b), when the driver's line of sight gazes at the mobile terminal 1000 for less than (below) a predetermined period of time (t1), the processor 870 may maintain the manual driving mode.

For example, when the driver's line of sight gazes at the mobile terminal 1000 less than a predetermined period of time (t1) in a state that the vehicle is in a manual driving mode, the processor 870 may maintain the manual driving mode.

The predetermined period of time (t1) may denote a period of time for which the driver gazes at the mobile terminal to switch the driving mode of the vehicle from a manual driving mode to an autonomous driving mode, and may be determined/changed by the user's setting. For an example, the predetermined period of time (t1) may be applicable according to the regulation of the law.

Figure 10B:
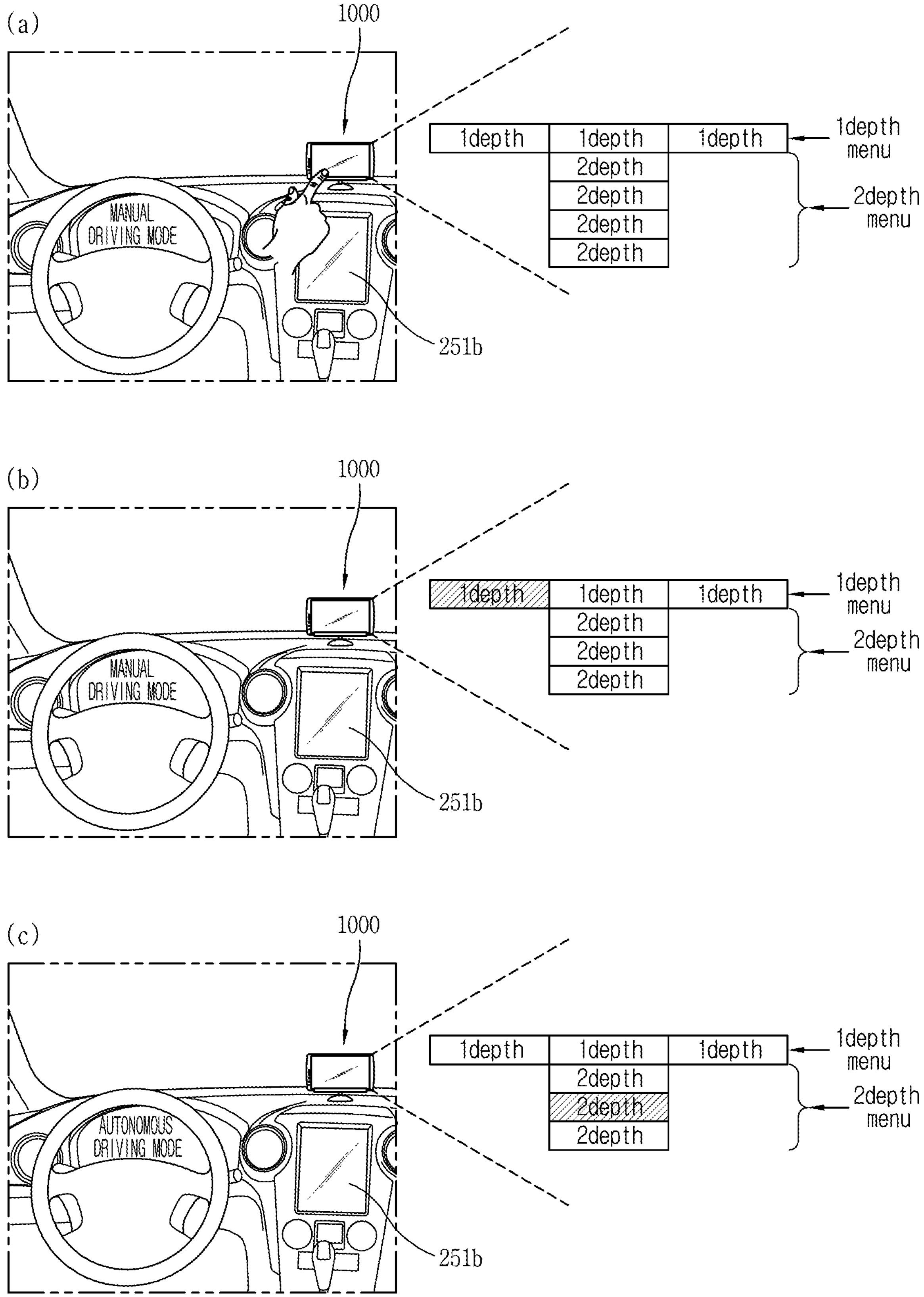

In some implementations, referring to FIG. 10B(a), a plurality of selectable menu items may be displayed on the mobile terminal. The plurality of menu items may be displayed on a touch screen of the mobile terminal.

The plurality of menu items may be respectively formed to have a preset depth. The depth indicates a level of a menu in applications or operating systems of a mobile device. In some implementations, each menu item can be associated with a respective menu level. For example, some menu items can be associated with a two-level and other menu items can be associated with a three-level.

In this example, the depth may be understood as a concept corresponding to a number of applied touches to execute a function linked to the relevant menu item. For example, a menu item (2-depth menu) having two depths may be an item that requires one touch input to display screen information for executing a function linked to the relevant item or controlling a function linked to the relevant item on the touch screen. For another example, a menu item (2-depth menu) having two depths may be an item that requires two touch inputs to execute a specific function (or display screen information for executing a specific function on the touch screen). A menu item having more than two depths may have a lower menu item.

The depth may be defined based on a number of layers of a menu item linked to a lower menu item.

In this example, when it is a menu item having a higher depth, a larger number of touch inputs may be required to execute the user's desired function. Accordingly, when a driver who is driving a vehicle executes his or her desired function through a menu item having a higher depth, a period of time of not gazing at the front side may increase.

When a menu item having a depth above a predetermined value is selected on the mobile terminal, the processor 870 may switch a manual driving mode to an autonomous driving mode.

When any one of a plurality of menu items displayed on the touch screen is selected (touched), the mobile terminal 1000 may transmit information (for example, depth information) associated with the selected menu item to the vehicle control device 800 through the communication unit.

Then, the processor 870 of the vehicle control device 800 may determine a depth of the selected menu item on the mobile terminal based on information associated with the menu item.

When a menu item selected on the mobile terminal is a menu item having more than a predetermined depth, the processor 870 may change a driving mode of the vehicle from a manual driving mode to an autonomous driving mode.

For example, as illustrated in FIG. 10B(c), when a menu item (for example, 2-depth) having more than a predetermined depth is selected among a plurality of menu items displayed on the mobile terminal 1000, the processor 870 may switch the driving mode of the vehicle to an autonomous driving mode.

For another example, as illustrated in FIG. 10B(b), when a menu item (for example, 1-depth menu) having less than a predetermined depth is selected among a plurality of menu items displayed on the mobile terminal 1000, the processor 870 may maintain the driving mode of the vehicle in a manual driving mode.

As described above, when a period of time of not gazing the front side increases as the user gazes at the mobile terminal for more than a predetermined period of time or selects a menu item having a more than a predetermined depth, the malicious code detection and classification system may switch the driving mode of the vehicle from a manual driving mode to an autonomous driving mode, thereby providing a control method capable of significantly enhancing the safety of the driving.

In some implementations, when a predetermined period of time has passed after receiving the user input in an autonomous driving mode, the autonomous driving mode may be switched (restored) to the manual driving mode.

Figure 10C:
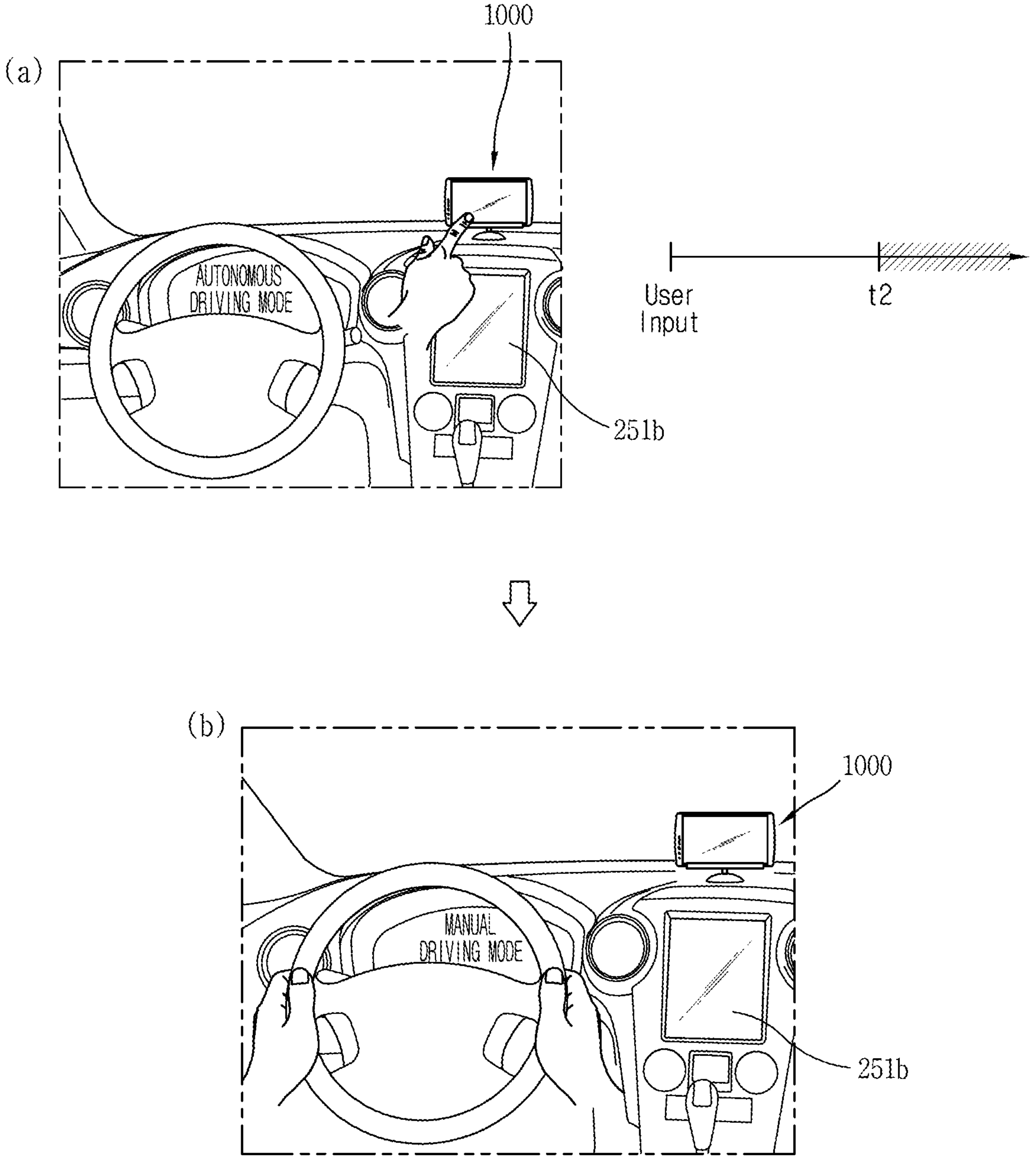

For example, as illustrated in FIG. 10C(a), when a predetermined period of time (t2) has passed from a time point at which a user input is received (for example, a time point at which the user's line of sight is deviated from the mobile terminal or a time point at which a menu item having more than a predetermined depth is selected) in a state that the autonomous driving mode of the vehicle enters the manual driving mode as the user input received at the mobile terminal 1000 satisfies a preset condition, the processor 870 may switch (restore) the driving mode of the vehicle from the autonomous driving mode to the manual driving mode as illustrated in FIG. 10C(b).

Figure 11A:
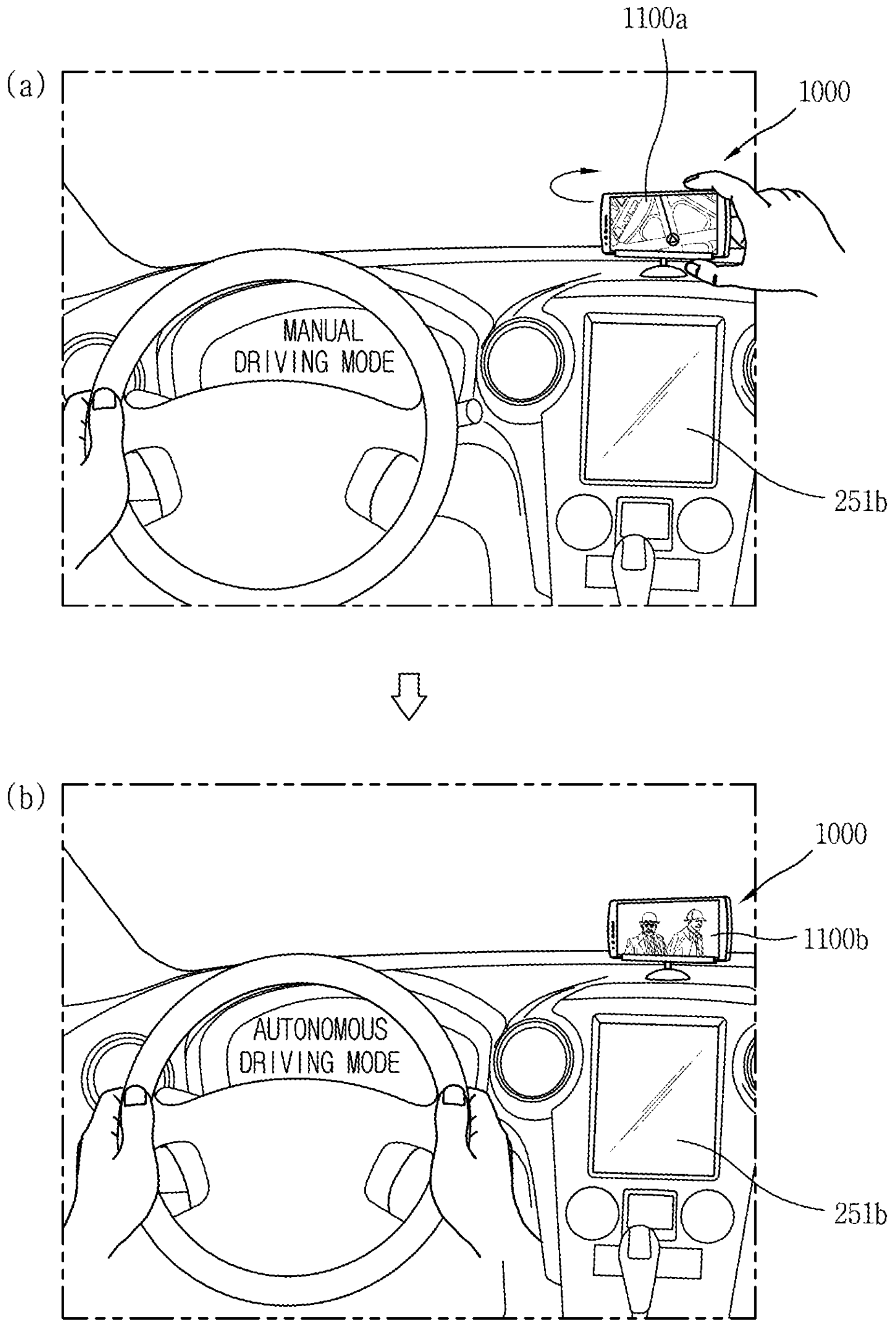

When the mobile terminal 1000 is inclined more than a predetermined angle by the user as illustrated in FIG. 11A(a), the processor 870 may switch a manual driving mode to an autonomous driving mode as illustrated in FIG. 11A(b).

Specifically, in a state that the driving mode of the vehicle is in a manual driving mode, the processor 870 may sense that the mobile terminal mounted within the vehicle is inclined more than a predetermined angle (in a direction in which the touch screen of the mobile terminal faces a driver).

The predetermined angle may be an angle at which the mobile terminal linked to a function of switching the driving mode of the vehicle from a manual driving mode to an autonomous driving mode is inclined, and may be determined/changed by the user's setting.

In this example, the processor 870 may switch the driving mode of the vehicle from a manual driving mode to an autonomous driving mode based on that the mobile terminal is inclined more than a predetermined angle in one direction.

In this example, as illustrated in FIG. 11A(b), the mobile terminal 1000 may execute a preset function based on the inclination of the mobile terminal 1000.

For example, the controller of the mobile terminal 1000 may perform a preset function (for example, video playback, map information display, music playback, etc.) when the mobile terminal body is inclined more than a predetermined angle in one direction by the user.

The preset function may be carried out by the controller of the mobile terminal 1000 as well as carried out on the mobile terminal by the control of the processor 870 of the vehicle control device 800.

When the mobile terminal 1000 connected to enable communication is inclined more than a predetermined angle in one direction, the processor 870 may control the mobile terminal 1000 to execute the preset function on the mobile terminal.

In other words, the vehicle control device may switch the driving mode of the vehicle to an autonomous driving mode, and perform a function preset on the mobile terminal when the mobile terminal is inclined more than a predetermined angle in one direction by the user.

In this example, inclining the mobile terminal at a predetermined angle in one direction may be included in a user input received at the mobile terminal.

An execution screen 1100*b* on which a preset function is carried out may be displayed on the touch screen of the mobile terminal.

For example, when first screen information (for example, map information 1100*a*) is displayed prior to being inclined, and then a preset function is carried out as the mobile terminal is inclined more than a predetermined angle in one direction by the user, the execution screen 1100*b* of the executed function may be displayed on the touch screen of the mobile terminal.

Through the foregoing configuration, the vehicle control device may provide an interface capable of allowing a user who is driving to switch a driving mode to an autonomous driving mode in a more convenient manner, and executing a function preset by the user on the mobile terminal in a more intuitive and easier manner.

Figure 11B:
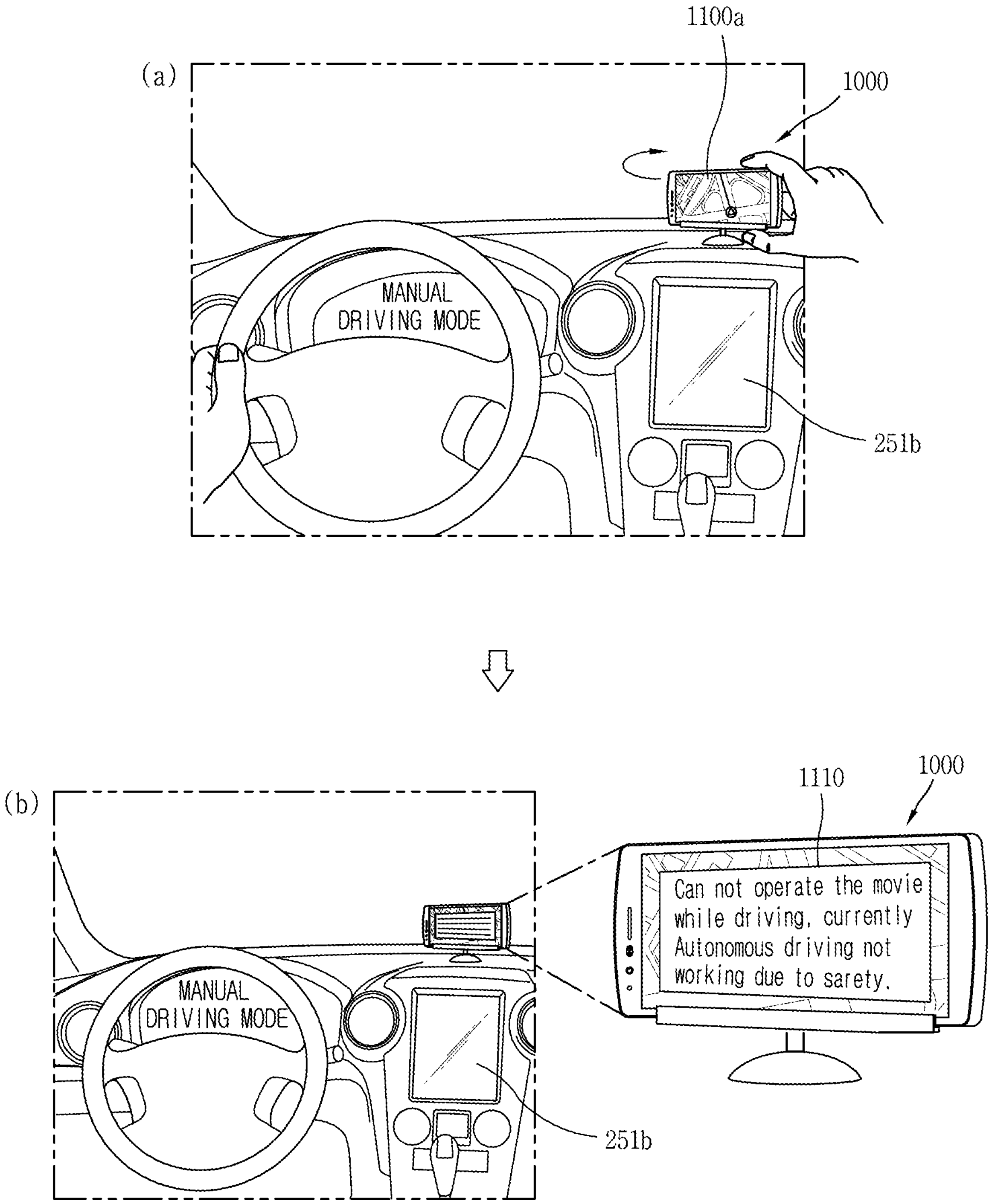

In some implementations, as illustrated in FIG. 11B(a), when switching to an autonomous driving mode is not allowed at a time point at which the mobile terminal 1000 is inclined, the processor 870 may maintain a manual driving mode.

Specifically, when the mobile terminal 1000 is inclined more than a predetermined angle in one direction, the processor 870 may determine whether or not switching to an autonomous driving mode is allowed.

For example, when a normal operation of the sensing unit 830 or camera 840 is not allowed (or failed) or the sensed surrounding environment of the vehicle is determined that an autonomous driving mode is not allowed, the processor 870 may determine that switching to the autonomous driving mode is not allowed.

A condition in which an autonomous driving mode is not allowed due to the surrounding environment of the vehicle may include a case where there is a heavy fog, rain falls more than a certain amount, snow falls more than a certain amount, a road is under construction, lane identification is impossible, or the like.

Furthermore, the mobile terminal 1000 may be limited to execute a preset function according to the inclination of the mobile terminal as illustrated in FIG. 11B(b). In this example, information for notifying that the execution of the preset function is limited or information 1110 for notifying that a driving mode of the vehicle is not switched to an autonomous driving mode may be displayed on the touch screen of the mobile terminal.

The information 1110 may be displayed by the control of the controller of the mobile terminal or displayed by the control of the processor 870.

When a condition in which an autonomous driving mode is not allowed is switched to a condition in which the autonomous driving mode is allowed, the processor 870 may switch the driving mode of the vehicle from a manual driving mode to the autonomous driving mode, and perform a preset function on the mobile terminal.

Figure 11C:
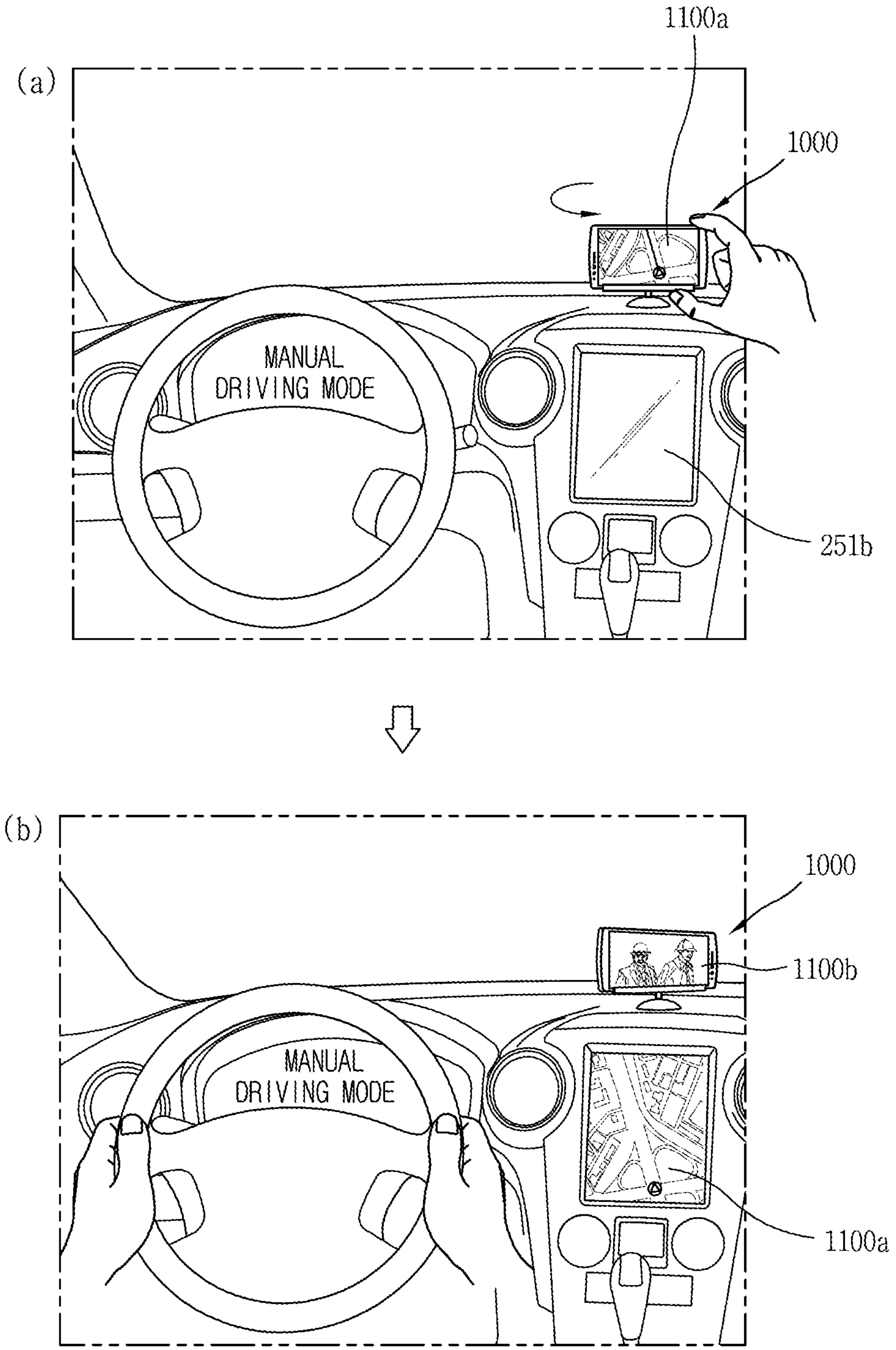

In some implementations, when the mobile terminal is inclined in another direction (for example, a direction in which the touch screen of the mobile terminal faces a passenger seat) different from said one direction (for example, a direction in which the touch screen of the mobile terminal faces a driver) in a state that the driving mode of the vehicle is in a manual driving mode as illustrated in FIG. 11C(a), the processor 870 may maintain the manual driving mode as illustrated in FIG. 11C(b).

Specifically, when the mobile terminal 1000 is inclined more than a predetermined angle in said another direction, the processor 870 may maintain the manual driving mode without switching the driving mode of the vehicle to the autonomous driving mode.

When the mobile terminal 1000 is inclined more than a predetermined angle in said another direction, the mobile terminal 1000 may perform a preset function (for example, video playback) as described above.

In this example, the processor 870 may display screen information 1100*a* being displayed on the mobile terminal on the display unit 251, 251*b* provided in the vehicle based on the inclination of the mobile terminal 1000 in said another direction.

Specifically, when the mobile terminal 1000 is inclined (or rotated) more than a predetermined angle in another direction different from said one direction (another direction opposite to one direction in which the touch screen of the mobile terminal faces a driver), the processor 870 may display first screen information 1100*a* being displayed prior to the inclination of the mobile terminal 1000 on the display unit case 251 provided in the vehicle.

Furthermore, the processor 870 may display an execution screen 1100*b* of a preset function carried out as the mobile terminal 1000 is inclined more than a predetermined angle on the touch screen of the mobile terminal 1000.

The execution screen 1100*b* may be displayed on the touch screen of the mobile terminal by the control of the controller of the mobile terminal.

The processor 870 of the vehicle control device may switch a manual driving mode to an autonomous driving mode when the mobile terminal 1000 is inclined more than a predetermined angle in one direction (for example, the touch screen of the mobile terminal faces a driver).

Furthermore, the processor 870 of the vehicle control may maintain a manual driving mode when the mobile terminal 1000 is inclined in another direction opposite to said one direction by the user.

In addition, the processor 870 may move and display screen information on the display unit provided in the vehicle to allow a driver to continuously view the screen information being displayed on the mobile terminal 1000 when the mobile terminal is inclined more than a predetermined angle in another direction (for example, a direction in which the touch screen of the mobile terminal faces a passenger seat).

A control method can provide maintaining the display of information for a driver as well as enhancing the convenience of a passenger sitting on a passenger seat.

In addition, the vehicle control device may change a driving mode of the vehicle based on the type of an application carried out on the mobile terminal.

The processor 870 may sense (determine, detect, judge) the type of an application carried out on the mobile terminal. For example, the processor 870 may receive information associated with an application carried out on the mobile terminal 1000 through the communication unit 810 from the mobile terminal 1000 that is communicable.

The processor 870 may determine the type (or kind) of an application carried out on the mobile terminal 1000 based on information associated with the application received from the mobile terminal 1000.

Then, the processor 870 may determine whether or not to switch a manual driving mode to an autonomous driving mode based on the type of an application carried out on the mobile terminal 1000.

Figure 12A:
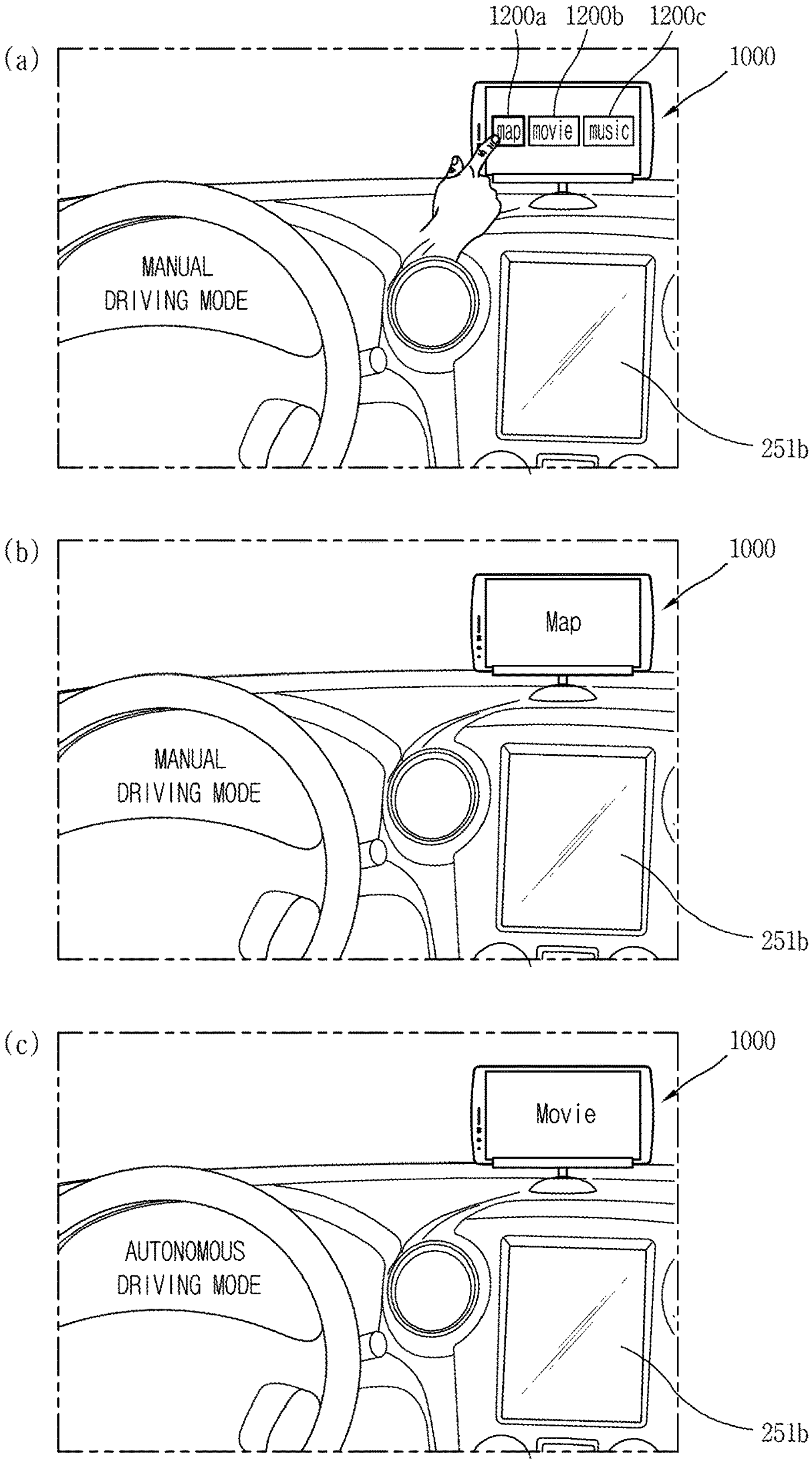

For example, when a first type of application 1200*a* is carried out on the mobile terminal 1000 (or an application carried out on the mobile terminal 1000 is a first type of application 1200*a*) in a state that the driving mode of the vehicle is in a manual driving mode as illustrated in FIG. 12A(a), the processor 870 may maintain the manual driving mode as illustrated in FIG. 12A(b).

For another example, when a second type of application 1200*b* different from the first type is carried out on the mobile terminal 1000 (or an application carried out on the mobile terminal 1000 is a second type of application 1200*b*), the processor 870 may switch the manual driving mode to an autonomous driving mode.

In this example, the first type of application and the second type of application may be determined by the user's setting or classified according to a criteria defined by the regulation of the law.

For example, the first type of application may be an application with a minimum of risk for manual driving, and may include a map application, a navigation application, a music playback application, a voice call application, or the like, for example.

For another example, the second type of application may be an application with a lot of risk for manual driving, and may include a video playback application, an image display application, a game application, a DMB application, a video call application or the like, for example.

In some implementations, the first and the second type of application may be determined or changed by the user's setting.

In other words, the processor 870 may maintain a driving mode of the vehicle in a manual driving mode when a first type of application is carried out on the mobile terminal, and switch the driving mode of the vehicle from the manual driving mode to an autonomous driving mode when a second type of application is carried out.

In some implementations, even though a second type of application is carried out on the mobile terminal 1000, the processor 870 may maintain the manual driving mode when the mobile terminal is inclined in a preset direction (for example, the foregoing another direction, that is, a direction in which the touch screen of the mobile terminal faces a passenger seat).

Figure 12B:
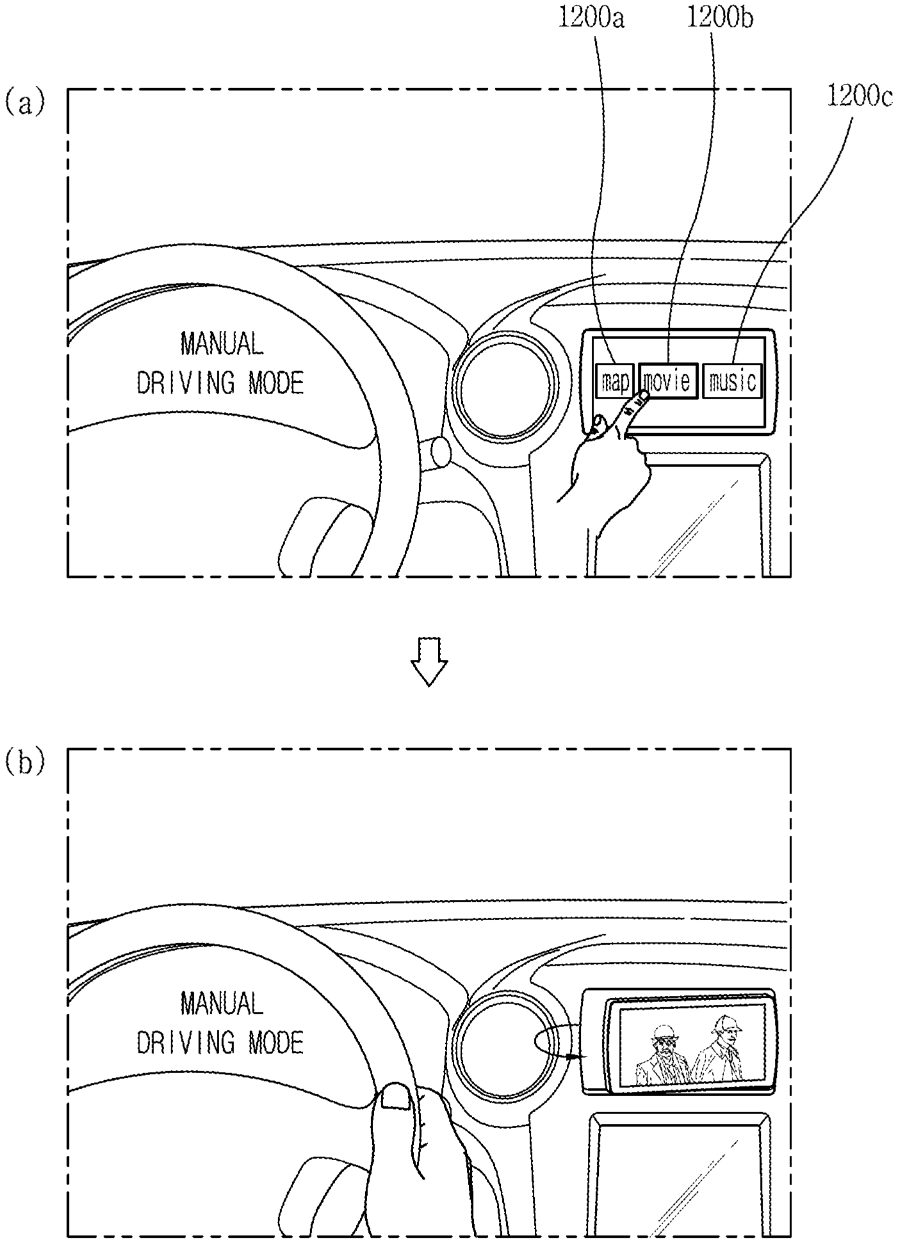

For example, even though the second type of application 1200*b* is carried out on the mobile terminal 1000 in a state that a driving mode of the vehicle of the vehicle is in a manual driving mode as illustrated in FIG. 12B(a), the processor 870 may maintain the manual driving mode without switching the driving mode of the vehicle to an autonomous driving mode when the mobile terminal 1000 is inclined more than a predetermined angle by the user in a preset direction (for example, a direction in which the touch screen of the mobile terminal faces a passenger seat other than a driver's seat) as illustrated in FIG. 12B(b).

In some implementations, the vehicle control device 800 may switch a manual driving mode to an autonomous driving mode when the vehicle control device 800 is connected to the mobile terminal 1000 to enable communication, and a touch is applied to the touch screen of the mobile terminal after an event has occurred on the mobile terminal in a state that the driving mode of the vehicle is in the manual driving mode.

Figure 13A:
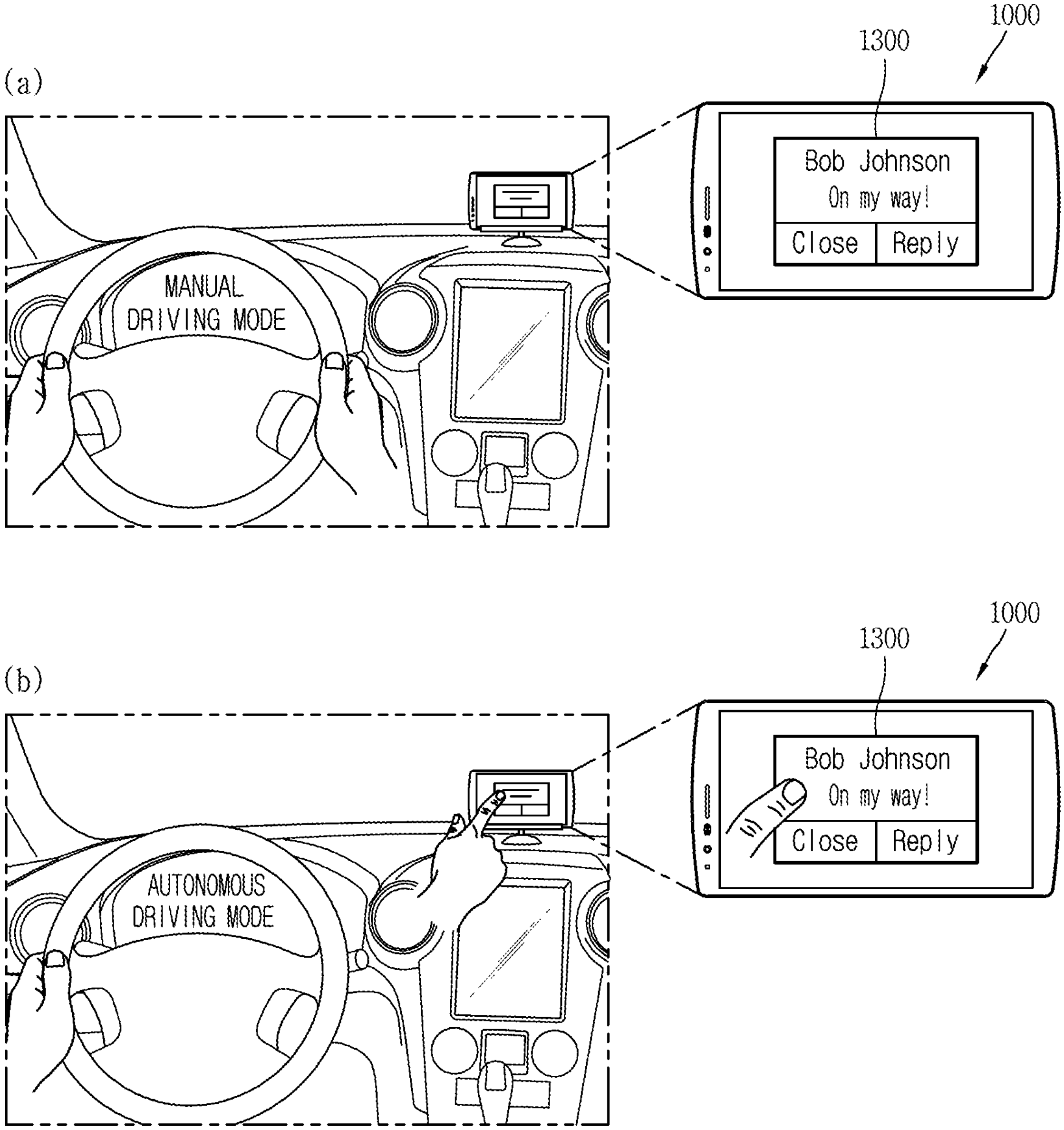

For example, as illustrated in FIG. 13A(a), when an event (for example, call signal received, phone call, video call, messenger, message received, notification information received, pop-up message received, etc.) occurs on the mobile terminal 1000, information 1300 associated with the event may be displayed on the touch screen of the mobile terminal 1000.

Then, as illustrated in FIG. 13A(b), when a touch is applied to the touch screen of the mobile terminal 1000 in a state that the information 1300 associated with the event is displayed, the processor 870 may switch the driving mode of the vehicle from a manual driving mode to an autonomous driving mode.

In some implementations, when the event occurred on the mobile terminal 1000 is a specific event (or a preset event)

in a state that the driving mode of the vehicle is in a manual driving mode, the processor 870 may maintain the manual driving mode even through a touch is applied to the touch screen of the mobile terminal.

Figure 13B:
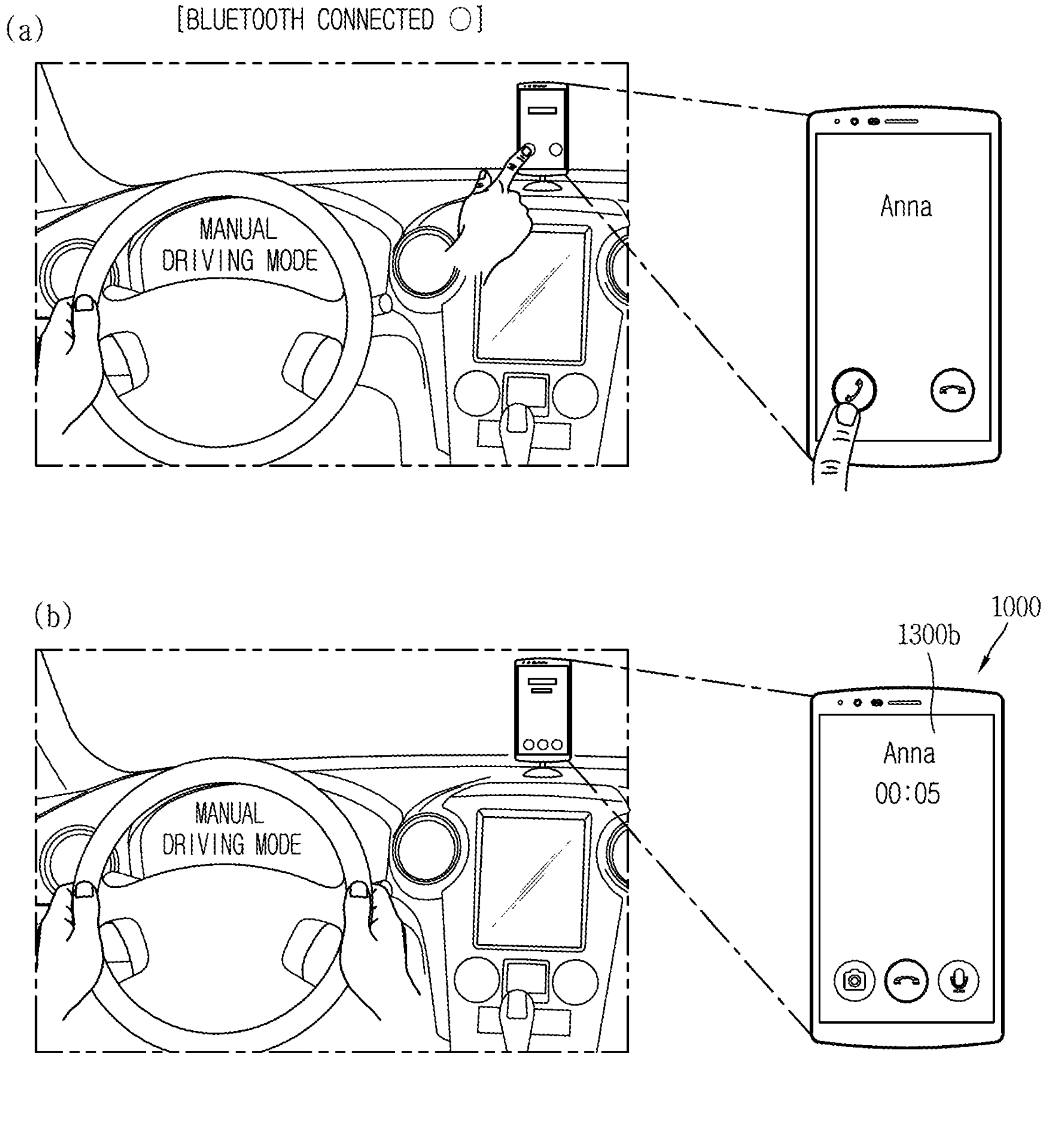

For example, as illustrated in FIG. 13B(a), the specific event may be an event with a small effect on manual driving among all types of events that can occur on the mobile terminal. For example, the specific event may be call signal received, voice call received, or the like.

When the specific event occurs on the mobile terminal 1000 and then a touch is applied to the touch screen as illustrated in FIG. 13B(a), the processor 870 may maintain a manual driving mode, as illustrated in FIG. 13B(b), without changing the driving mode of the vehicle from the manual driving mode to an autonomous driving mode.

In some implementations, when communication is not connected between the mobile terminal and the vehicle (or the vehicle control device) even though the specific event occurs on the mobile terminal, the processor 870 may switch the manual driving mode to the autonomous driving mode in response to a touch applied to the touch screen of the mobile terminal.

Figure 13C:
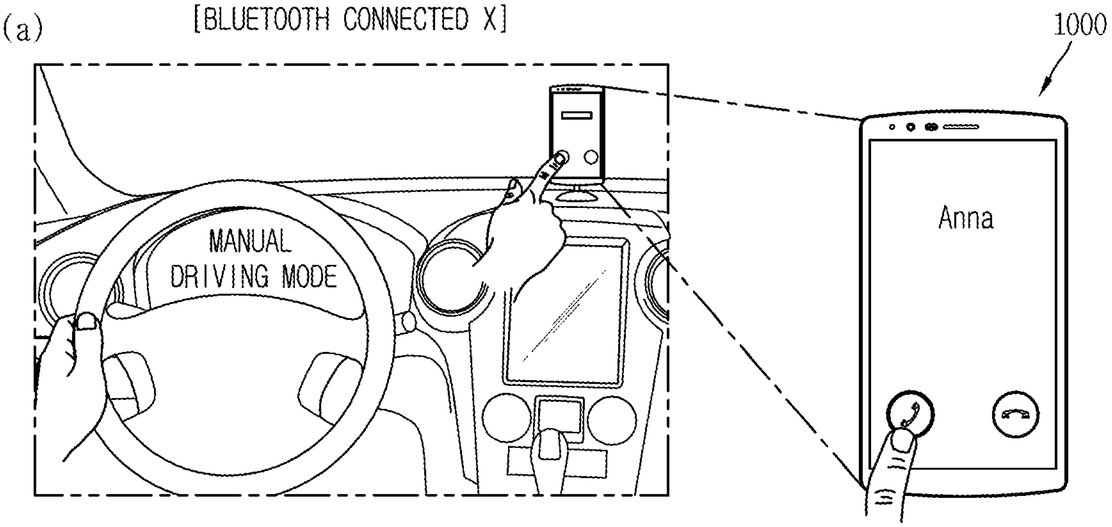
Figure 13C:
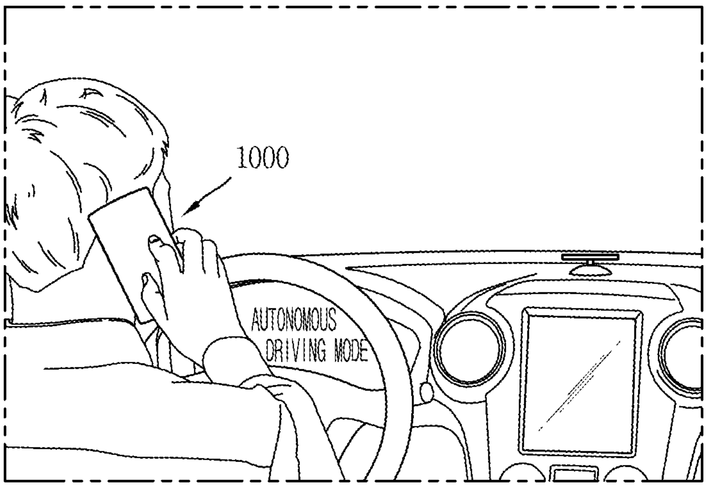

For example, when communication (for example, wired/wireless communication, Bluetooth, short-range communication) is not connected between the mobile terminal 1000 and the vehicle 100 even though the specific event occurs on the mobile terminal as illustrated in FIG. 13C(a), the processor 870 may switch the driving mode of the vehicle from a manual driving mode to an autonomous driving mode in response to a touch applied to the touch screen of the mobile terminal as illustrated in FIG. 13C(b).

For another example, when it is sensed that the specific event occurs and then a touch is applied to the touch screen, and the mobile terminal is moved by the user, the processor 870 may switch the driving mode of the vehicle from a manual driving mode to an autonomous driving mode even though the occurred event is a specific event.

In other words, the vehicle control device may switch the driving mode of the vehicle from an autonomous driving mode to a manual driving mode when an event occurs on the mobile terminal, and a response to this is received at the mobile terminal.

In some implementations, in case where the occurred event is a specific event (for example, voice call, call signal received) with a small effect on driving, the vehicle control device may maintain the driving mode of the vehicle in a manual driving mode when a response to this is received at the mobile terminal.

On the contrary, when it is sensed that a communication is not connected between the vehicle and the mobile terminal or the mobile terminal is moved by the driver (user) even though the occurred event is the specific event, the processor 870 may switch the driving mode of the vehicle from a manual driving mode to an autonomous driving mode.

Through the foregoing configuration, the vehicle control device may provide a control method associated with the vehicle capable of driving the vehicle in a safer manner even though an application is carried out according to the user's will as well as in response to an event that has occurred on the mobile terminal.

Figure 14A:
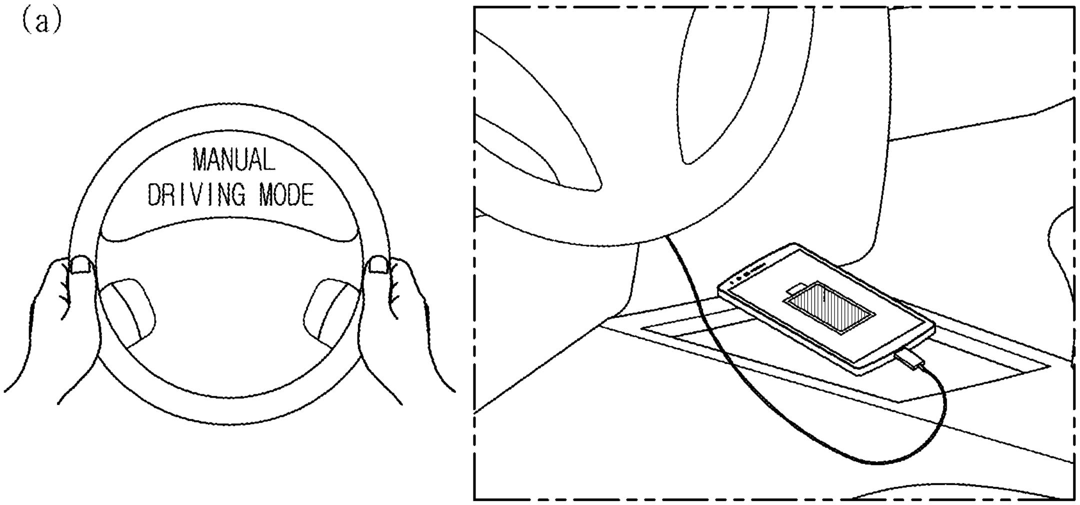
Figure 14A:
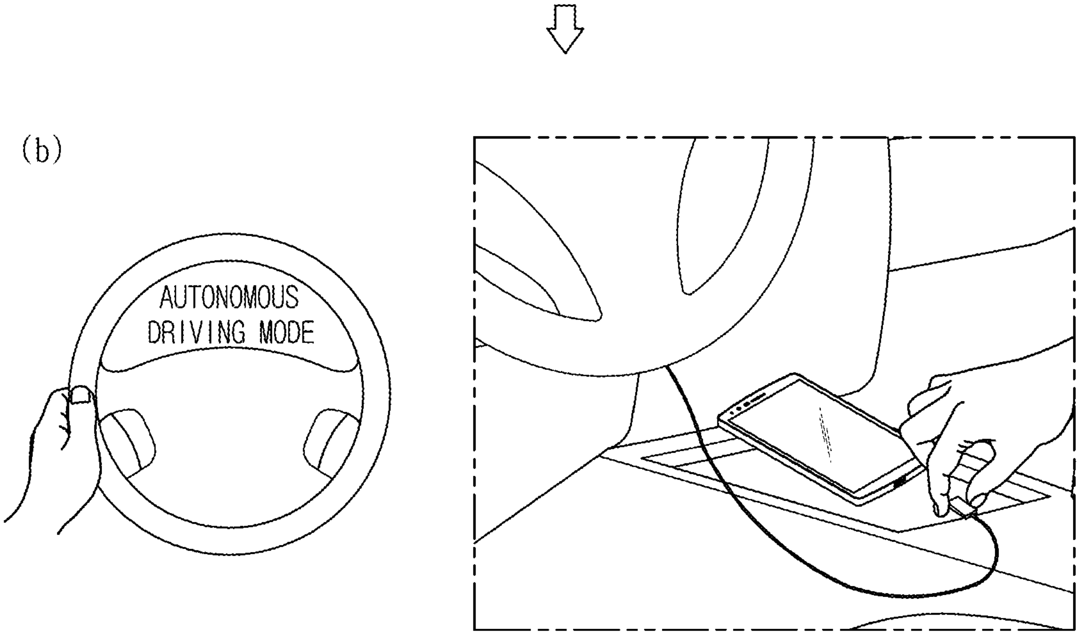

In some implementations, the processor 870 may switch a manual driving mode to an autonomous driving mode as illustrated in FIG. 14A(b) based on that wired connection between the mobile terminal and the vehicle is released in a state that the mobile terminal and the vehicle 100 (or the vehicle control device 800) are connected in a wired manner as illustrated in FIG. 14A(a).

Furthermore, in a state that the driving mode of the vehicle is in a manual driving mode, the processor 870 may switch the manual driving mode of the vehicle to an autonomous driving mode when charging is suspended (or the wired connection is separated) in a state that the mobile terminal connected in a wired manner through the interface unit is being charged.

Furthermore, when it is sensed that the mobile terminal moves in a preset movement, the processor 870 may switch a manual driving mode to an autonomous driving mode.

Figure 14B:
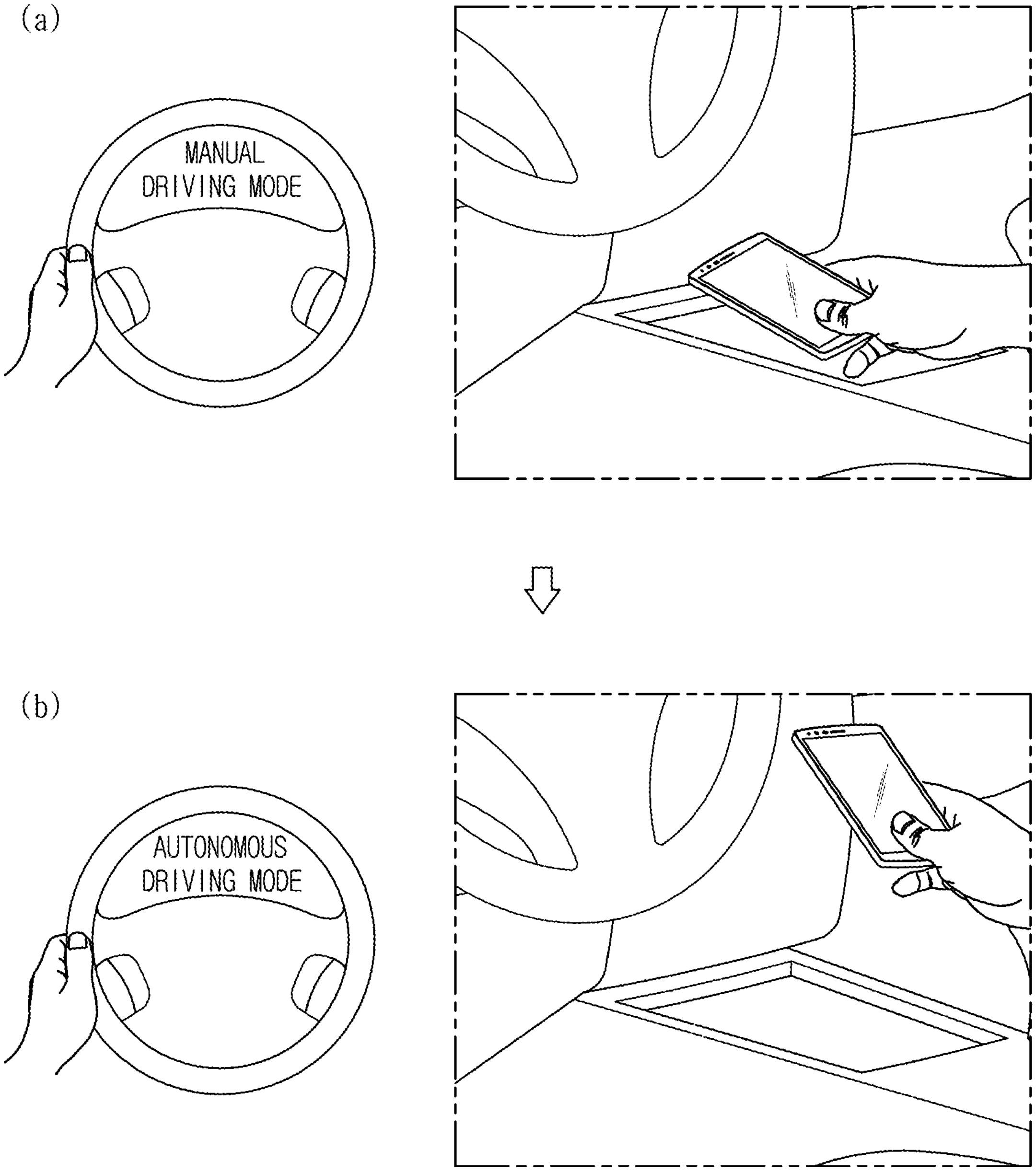

For example, as illustrated in FIG. 14B, when a preset movement (for example, a movement in which the mobile terminal is pulled up by the user or a movement in which the mobile terminal moves more than a predetermined distance) is sensed on the mobile terminal 1000, the processor 870 may switch the driving mode of the vehicle from a manual driving mode to an autonomous driving mode.

Figure 15:
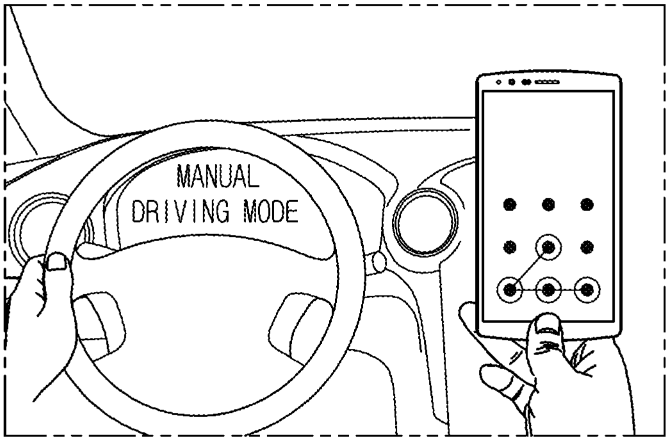
Figure 15:
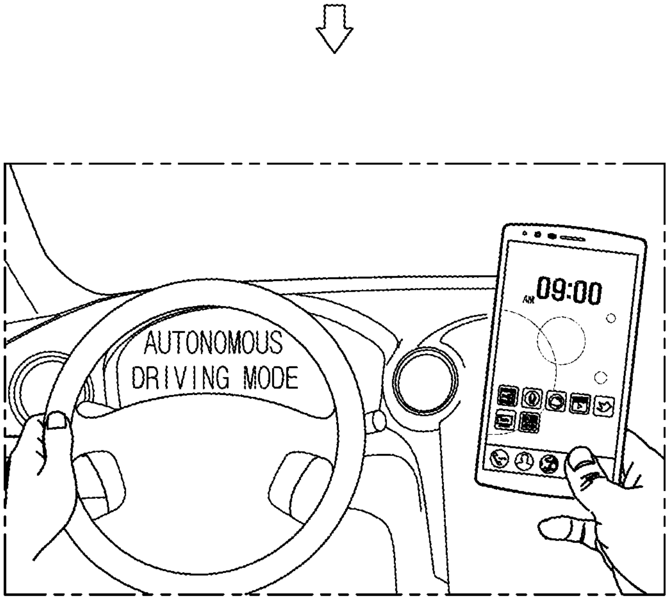

For another example, as illustrated in FIG. 15, when it is sensed that a locked state of the mobile terminal 1000 is released in a state that the driving mode of the vehicle is in a manual driving mode, the processor 870 may switch the driving mode of the vehicle from the manual driving mode to an autonomous driving mode.

Figure 16:
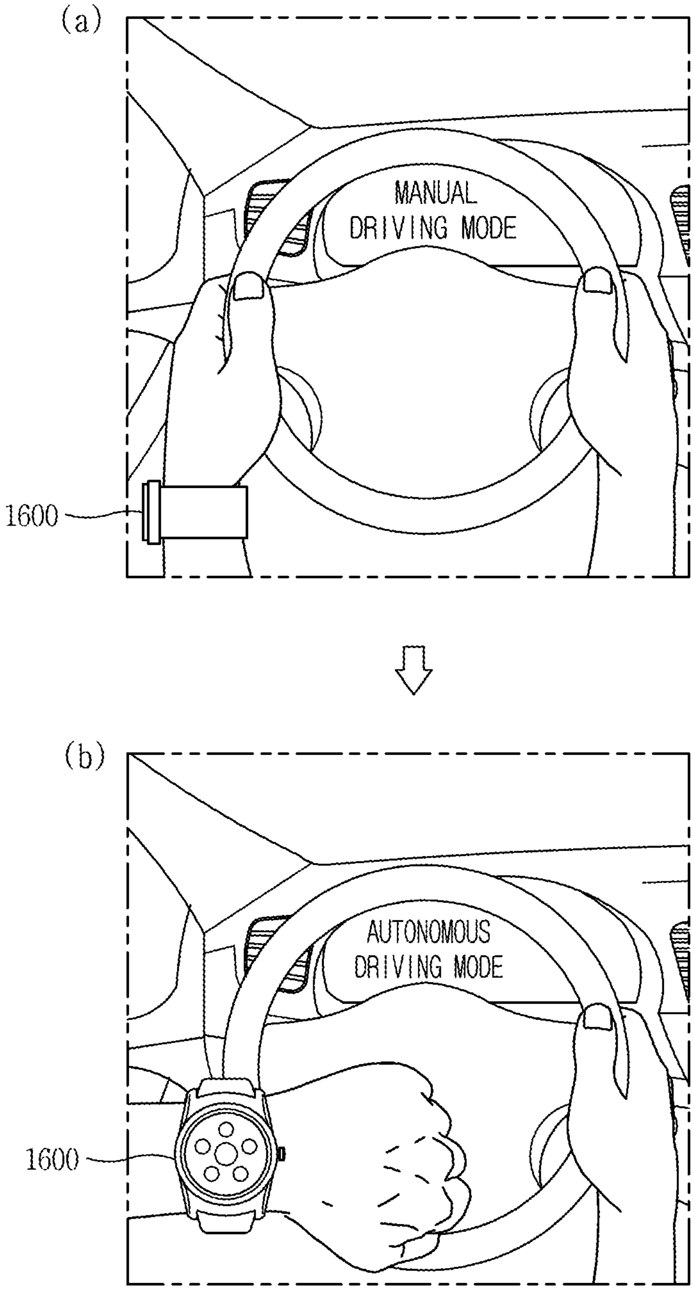

For still another example, as illustrated in FIG. 16, when a watch-type mobile terminal 1600 moves in a preset movement (for example, a driver gazes at the watch-type mobile terminal 1600 for more than a predetermined period of time or the watch-type mobile terminal 1600 moves while forming a specific trajectory), the processor 870 may switch the driving mode of the vehicle from a manual driving mode to an autonomous driving mode.

The processor 870 may sense (determine, detect, judge) an event occurred on the mobile terminal, an application executed on the mobile terminal, a user input (or touch) received at (applied to) the mobile terminal, a function carried out on the mobile terminal, or the like, through the communication unit 810 as described above.

In some implementations, user input is received at the mobile terminal. For example, release of a locked state, a movement of the mobile terminal, a touch in response to an event occurred on the mobile terminal, an execution of an application or the like may be included in a user input received at the mobile terminal disclosed in the present specification.

In some implementations, switching the driving mode of the vehicle (i.e., switching from a manual driving mode to an autonomous driving mode or switching from an autonomous driving mode to a manual driving mode) may be carried out on the assumption that the vehicle is driving. In some other implementations, switching the driving mode of the vehicle may be carried out even in a state that the vehicle is stationary.

The vehicle control device 800 may be included in the vehicle 100.

Furthermore, the foregoing operation or control method of the vehicle control device 800 will be analogically applied to the operation and control method of the vehicle 100 (or controller 170) in the same or similar manner.

For example, the control method of the vehicle 100 (or the control method of the vehicle control device 800) may include the process of connecting to a mobile terminal to enable communication, and switching a manual driving mode to an autonomous driving mode based on that a user input received at the mobile terminal satisfies a preset condition in a state that a driving mode of a vehicle is in the manual driving mode.

The above process may be carried out by the controller 170 provided in the vehicle 100 as well as by the vehicle control device 800.

Furthermore, every function, configuration or control method executed by the vehicle control device 800 may be executed by the controller 170 provided in the vehicle 100. In other words, every control method disclosed herein may be applicable to the control method of the vehicle, and also applicable to the control method of the control device.

The foregoing examples may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative.

What is claimed is:

1. A vehicle control device for a vehicle, the vehicle control device comprising:

a communication unit that is configured to communicate with a mobile device and to receive data including user input that is received at the mobile device; and a processor that is configured to:

based on receipt of at least a portion of the data, determine whether the vehicle operates in a manual driving mode or an autonomous driving mode, wherein a plurality of menu items are displayed on the mobile device, each of the plurality of menu items being associated with a respective menu level, and wherein the processor is configured to:

based on the data including the user input, determine whether a first menu level for a first menu item from the plurality of menu items is selected by a user, based on a determination that the first menu level for the first menu item from the plurality of menu items is selected by the user, determine whether the first menu level satisfies a threshold menu level, and based on determinations that the vehicle is in the manual driving mode and that the first menu level satisfies the threshold menu level, switch the vehicle from the manual driving mode to the autonomous driving mode.

2. The vehicle control device of claim 1, further comprising:

a camera that is configured to obtain first eye tracking information of a user, wherein the processor is configured to:

obtain, from the camera, the first eye tracking information, based on the first eye tracking information, determine whether the user uses the mobile device for a first time period, and based on determinations that the vehicle is in the manual driving mode and that the user uses the mobile device for the first time period, switch the vehicle from the manual driving mode to the autonomous driving mode.

3. The vehicle control device of claim 1, wherein the user input includes second eye tracking information of a user, and wherein the processor is configured to:

based on the second eye tracking information, determine whether the user uses the mobile device for a second time period, and based on determinations that the vehicle is in the manual driving mode and that the user uses the mobile device for the second time period, switch the vehicle from the manual driving mode the autonomous driving mode.

4. A control method of a vehicle, the control method comprising:

connecting a communication unit to a mobile device to enable communication between the mobile device and the communication unit;

receiving, from the mobile device, data including user input that is received at the mobile device, information about a connection between the mobile device and the communication unit, and information about an event that occurs on the mobile device;

based on receipt of at least a portion of the data, determining whether the vehicle operates in a manual driving mode or an autonomous driving mode; and based on (i) a determination that the vehicle is in the manual driving mode, (ii) the information about the connection between the mobile device and the communication unit, and (iii) the event that occurs on the mobile device, switching the vehicle from the manual driving mode to the autonomous driving mode, wherein a plurality of menu items are displayed on the mobile device, each of the plurality of menu items being associated with a respective menu level, and wherein the control method further comprises:

based on the data including the user input, determining whether a first menu level for a first menu item from the plurality of menu items is selected by a user, based on a determination that the first menu level for the first menu item from the plurality of menu items is selected by the user, determining whether the first menu level satisfies a threshold menu level, and based on determinations that the vehicle is in the manual driving mode and that the first menu level satisfies the threshold menu level, switching the vehicle from the manual driving mode to the autonomous driving mode.

5. The vehicle control device of claim 1, wherein the processor is configured to:

based on the data including the user input, determine a time period that the user input has been received, and based on (i) a determination that the vehicle is in the manual driving mode and (ii) the time period, switch the vehicle from the manual driving mode to the autonomous driving mode.

6. The vehicle control device of claim 1, wherein the data that are received by the communication unit from the mobile device further include orientation information of the mobile device, and wherein the processor is configured to:

based on (i) a determination that the vehicle is in the manual driving mode and (ii) the orientation information of the mobile device, switch the vehicle from the manual driving mode to the autonomous driving mode.

7. The vehicle control device of claim 6, wherein the processor is configured to:

generate, based on the orientation information of the mobile device, a command signal that controls the mobile device to perform a first function, and provide, through the communication unit, the command signal to the mobile device.

8. The vehicle control device of claim 7, wherein the processor is configured to:

determine whether switching between the manual driving mode and the autonomous driving mode is locked, and based on (i) a determination that the vehicle is in the manual driving mode, (ii) the orientation information of the mobile device, and (iii) a determination of whether switching between the manual driving mode and the autonomous driving mode is locked, determine whether the command signal is provided to the mobile device.

9. The vehicle control device of claim 6, wherein the orientation information of the mobile device includes a direction that the mobile device is facing or a tilt angle of the mobile device.

10. The vehicle control device of claim 9, wherein the processor is configured to:

provide, based on the orientation information, screen information that is displayed on a display of the mobile device to a display unit of the vehicle through the communication unit.

11. The vehicle control device of claim 1, wherein the data that are received by the communication unit from the mobile device further include information about a plurality of applications that are executed on the mobile device, each of the plurality of applications being associated with a respective type, and wherein the processor is configured to:

based on (i) a determination that the vehicle is in the manual driving mode and (ii) the respective types of the plurality of applications, switch the vehicle from the manual driving mode to the autonomous driving mode.

12. The vehicle control device of claim 11, wherein the processor is configured to:

determine whether the mobile device executes a first type of application from the plurality of applications or a second type of application from the plurality of applications, the second type of application being different from the first type of application, and based on determinations that the vehicle is in the manual driving mode and that the mobile device executes the first type of application from the plurality of applications or the second type of application from the plurality of applications, switch the vehicle from the manual driving mode to the autonomous driving mode.

13. The vehicle control device of claim 12, wherein the data that are received by the communication unit from the mobile device further include orientation information of the mobile device, and wherein the processor is configured to:

based on (i) a determination that the vehicle is in the manual driving mode, (ii) the orientation information of the mobile device, and (iii) a determination that the mobile device executes the first type of application from the plurality of applications or the second type of application from the plurality of applications, switch the vehicle from the manual driving mode to the autonomous driving mode.

14. The vehicle control device of claim 1, wherein the data that are received by the communication unit from the mobile device further include touch input and information about an event that occurs on the mobile device, and wherein the processor is configured to:

based on (i) a determination that the vehicle is in the manual driving mode, (ii) the touch input, and (iii) the event that occurs on the mobile device, switch the vehicle from the manual driving mode to the autonomous driving mode.

15. The vehicle control device of claim 14, wherein the data that are received by the communication unit from the mobile device further include information about a connection between the mobile device and the communication unit, and wherein the processor is configured to:

based on (i) a determination that the vehicle is in the manual driving mode, (ii) the information about the connection between the mobile device and the communication unit, and (iii) the event that occurs on the mobile device, switch the vehicle from the manual driving mode to the autonomous driving mode.

16. The vehicle control device of claim 1, wherein the processor is configured to:

determine whether a wired connection between the mobile device and the communication unit is released, and based on determinations that the vehicle is in the manual driving mode and that the wired connection between the mobile device and the communication unit is released, switch the vehicle from the manual driving mode to the autonomous driving mode.

17. The vehicle control device of claim 1, wherein the data that are received by the communication unit from the mobile device further include information about a movement of the mobile device, and wherein the processor is configured to:

based on a determination that the vehicle is in the manual driving mode and the information about the movement of the mobile device, switch the vehicle from the manual driving mode to the autonomous driving mode.

18. The control method of claim 4, the control method further comprising:

obtaining eye tracking information of a user;

based on the eye tracking information of the user, determining whether the eye tracking information indicates that the user uses the mobile device for a first time period; and based on a determination that the vehicle is in the manual driving mode and the eye tracking information indicates that the user uses the mobile device for the first time period, switching the vehicle from the manual driving mode to the autonomous driving mode.

* * * * *